(12) United States Patent
Yu

(10) Patent No.: US 11,341,618 B2
(45) Date of Patent: May 24, 2022

(54) SYSTEMS AND METHODS FOR NOISE REDUCTION

(71) Applicant: ZHEJIANG DAHUA TECHNOLOGY CO., LTD., Zhejiang (CN)

(72) Inventor: Keqiang Yu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/305,668

(22) Filed: Jul. 13, 2021

(65) Prior Publication Data
US 2021/0342978 A1 Nov. 4, 2021

Related U.S. Application Data

(63) Continuation of application No. PCT/CN2019/120253, filed on Nov. 22, 2019.

(30) Foreign Application Priority Data

Jan. 17, 2019 (CN) .......................... 201910043897.9

(51) Int. Cl.
*G06T 5/00* (2006.01)
*G06T 5/50* (2006.01)

(52) U.S. Cl.
CPC ................ *G06T 5/002* (2013.01); *G06T 5/50* (2013.01); *G06T 2207/20182* (2013.01); *G06T 2207/20224* (2013.01)

(58) Field of Classification Search
CPC ..... G06T 5/001–009; G06T 5/10; G06T 5/20; G06T 5/50; G06T 3/4076; G06T 3/4053;
(Continued)

(56) References Cited

U.S. PATENT DOCUMENTS 5,313,298 A * 5/1994 Meeker .................. H04N 5/923
348/613
9,445,110 B2 * 9/2016 Leontaris ............... H04N 19/80
(Continued)

FOREIGN PATENT DOCUMENTS

CN 101018290 B 6/2010
CN 101950414 A 1/2011
(Continued)

OTHER PUBLICATIONS

International Search Report in PCT/CN2019/120253 dated Jan. 31, 2020, 4 pages.
(Continued)

*Primary Examiner* — Jose L Couso
(74) *Attorney, Agent, or Firm* — Metis IP LLC

(57) ABSTRACT

The present disclosure is related to systems and methods for noise reduction. The method includes determining a first image block in each of a group of continuous frames including a current frame and a plurality of reference frames based on coordinates of a target pixel in the current frame. The method includes determining at least one second image block corresponding to the first image block in each of the group of continuous frames. The method includes determining an average offset between the at least one second image block in the current frame and the second image blocks in the plurality of reference frames. The method includes determining a spatial domain filtering intensity and a temporal domain filtering intensity for the target pixel in the current frame.

20 Claims, 13 Drawing Sheets

(58) Field of Classification Search
CPC ......... G06T 3/4015; G06T 2207/20224; G06T 2207/20182; G06T 2207/10016; G06T 2207/20024; G06T 2207/30168; G06T 2207/10024; G06T 2207/20012; G06T 2207/20216; G06T 2207/20221; G06T 2207/20021; H04N 5/217; H04N 5/243; H04N 5/357; H04N 5/21; H04N 5/213; H04N 5/911; H04N 9/646; H04N 19/117; H04N 19/85; H04N 19/80; H04N 19/615; H04N 19/176; G06K 9/40; G06K 7/10851

See application file for complete search history.

(56) References Cited

U.S. PATENT DOCUMENTS

| | | | |
|---|---|---|---|
| 2006/0051068 A1* | 3/2006 | Gomila | H04N 19/82 386/263 |
| 2006/0056724 A1* | 3/2006 | Le Dinh | G06K 9/40 382/274 |
| 2006/0227869 A1* | 10/2006 | Joch | H04N 19/14 375/240.03 |
| 2008/0278607 A1* | 11/2008 | Zhang | G06T 5/002 348/241 |
| 2009/0180027 A1* | 7/2009 | Jang | H04N 9/66 348/639 |
| 2010/0165122 A1* | 7/2010 | Castorina | H04N 5/23248 348/208.4 |
| 2013/0126703 A1* | 5/2013 | Caulfield | H04N 5/30 250/206 |
| 2014/0064615 A1 | 3/2014 | Ren et al. | |
| 2014/0369429 A1* | 12/2014 | Laroche | H04N 19/117 375/240.29 |
| 2015/0373235 A1 | 12/2015 | Chiang et al. | |
| 2017/0374305 A1* | 12/2017 | Kostrzewa | G06T 5/005 |
| 2018/0315171 A1* | 11/2018 | Lee | H04N 5/33 |
| 2018/0322614 A1 | 11/2018 | Petrova et al. | |
| 2018/0324465 A1* | 11/2018 | Aydin | G06T 5/20 |

FOREIGN PATENT DOCUMENTS

| | | |
|---|---|---|
| CN | 102222327 A | 10/2011 |
| CN | 102238316 A | 11/2011 |
| CN | 103269412 A | 8/2013 |
| CN | 103369209 A | 10/2013 |
| CN | 103530854 A | 1/2014 |
| CN | 103997592 A | 8/2014 |
| CN | 104952042 A | 9/2015 |
| CN | 105306787 A | 2/2016 |
| CN | 106210448 A | 12/2016 |
| CN | 107610072 A | 1/2018 |
| CN | 108898567 A | 11/2018 |
| CN | 109859126 A | 6/2019 |
| EP | 0480807 A1 | 4/1992 |

OTHER PUBLICATIONS

Written Opinion in PCT/CN2019/120253 dated Jan. 31, 2020, 5 pages.
First Office Action in Chinese Application No. 201910043897.9 dated Jun. 28, 2020, 18 pages.
Jia, Zhaoyang, Research on Multispectral Image Digital Inpainting Technology for Painting Arts Reproduction, China Doctoral Dissertation Full Text Database Information Technology Series, 2018, 154 pages.
Han, Yubing et al., Efficient Video Denoising Based on Dynamic Nonlocal Means, Image and Vision Computing, 30 (2): 78-85, 2012.
The Extended European Search Report in European Application No. 19909701.5 dated Jan. 7, 2022, 7 pages.

* cited by examiner

Current Frame A

Current Frame B

FIG. 12

SYSTEMS AND METHODS FOR NOISE REDUCTION

CROSS-REFERENCE TO RELATED APPLICATIONS

This application is a continuation of International Application No. PCT/CN2019/120253, filed on Nov. 22, 2019, which claims priority to Chinese Patent Application No. 201910043897.9, filed on Jan. 17, 2019, the entire contents of each of which are incorporated herein by reference.

TECHNICAL FIELD

This present disclosure generally relates to systems and methods for image processing, and in particular, to systems and methods for noise reduction in producing digital images.

BACKGROUND

In an era of multimedia communication, digital image data is playing more and more important roles. However, such image data is often interfered with by the presence of noise. Principal sources of noise in digital imaging arise during image acquisition (digitization), recording, and/or transmission. The presence of noise in an image frame not only degrades its visual quality, but also the effectiveness of subsequent processing operations. For example, the coding efficiency for a particular image frame can be significantly decreased by noise.

Conventionally, spatial domain filtering or temporal domain filtering is usually performed on an image frame to reduce the noise in an image frame. For example, the spatial domain filtering typically denoises a motion area of an image frame based on spatial correlation among pixels in the image frame, and the temporal domain filtering typically denoises a stationary area of an image frame based on a temporal correlation among pixels in the image frame. A conventional spatial-temporal method of filtering combines the above two filtering methods by expanding spatial filtering to the temporal domain. A reasonable spatial domain filtering intensity relies on accuracy estimation of noise associated with the image frame, and a reasonable temporal domain filtering intensity relies on precision motion detection of the image frame. However, in the conventional spatial-temporal method, spatial domain filtering intensities and temporal domain filtering intensities for different pixels in an image frame are the same. Thus, it is desirable to provide systems and methods for adaptive noise reduction, which can improve visual quality and increase the performance of subsequent processing tasks such as coding, analysis, and interpretation.

SUMMARY

According to an aspect of the present disclosure, a method for noise reduction may be implemented on a computing device having at least one processor and at least one storage device. The method may include determining a first image block in each of a group of continuous frames including a current frame and a plurality of reference frames based on coordinates of a target pixel in the current frame. The method may include determining at least one second image block corresponding to the first image block in each of the group of continuous frames. The at least one second image block may be similar with the corresponding first image block. The method may include determining, based on coordinates of the second image blocks in the group of continuous frames, an average offset between the at least one second image block in the current frame and the second image blocks in the plurality of reference frames. The method may include determining, based on the average offset, a spatial domain filtering intensity and a temporal domain filtering intensity for the target pixel in the current frame.

In some embodiments, a larger average offset may correspond to a larger spatial domain filtering intensity and a smaller temporal domain filtering intensity.

In some embodiments, the method may include performing a spatial domain filtering operation and a temporal domain filtering operation on the target pixel in the current frame based on the spatial domain filtering intensity, the temporal domain filtering intensity, and a spatial domain filter size.

In some embodiments, the method may include performing, based on the spatial domain filtering intensity and the spatial domain filter size, the spatial domain filtering operation on the target pixel in the current frame to determine a first value of the target pixel in the current frame. The method may include performing, based on the temporal domain filtering intensity, the first value of the target pixel in the current frame, and a first value of a reference pixel in each reference frame of the plurality of reference frames, the temporal domain filtering operation on the target pixel in the current frame to determine a second value of the target pixel in the current frame. The coordinates of the target pixel in the current image may be the same as coordinates of the reference pixel in the each reference frame. The first value of the reference pixel in the each reference frame may be determined by performing a spatial domain filtering operation on the reference pixel in the each reference frame.

In some embodiments, the method may include determining, based on a weight of the temporal domain filtering operation associated with the reference pixel in the each reference frame of the plurality of reference frames, a weight of the temporal domain filtering operation associated with the target pixel in the current frame, and the temporal domain filtering intensity, a target temporal domain filtering intensity for each of the reference pixel in the each reference frame of the plurality of reference frames and the target pixel in the current frame. The method may include performing, based on the first value of the reference pixel in the each reference frame of the plurality of reference frames, the first value of the target pixel in the current frame, and the target temporal domain filtering intensity for the each of the reference pixel in the each reference frame of the plurality of reference frames and the target pixel in the current frame, the temporal domain filtering operation on the target pixel in the current frame to determine the second value of the target pixel in the current frame.

In some embodiments, the method may include determining, based on an original value of the target pixel, the first value of the target pixel, a weight of the temporal domain filtering operation associated with the target pixel, and a weight of the spatial domain filtering operation associated with the target pixel, an updated first value of the target pixel in the current frame. A sum of the weight of the temporal domain filtering operation associated with the target pixel and the weight of the spatial domain filtering operation associated with the target pixel may be 1.

In some embodiments, the method may include determining a product of the original value of the target pixel and the weight of the temporal domain filtering operation associated with the target pixel. The method may include determining a product of the first value of the target pixel and the weight of the spatial domain filtering operation associated with the target pixel. The method may include determining, based on a sum of the product of the original value of the target pixel and the weight of the temporal domain filtering operation associated with the target pixel, and the product of the first value of the target pixel and the weight of the spatial domain filtering operation associated with the target pixel, the updated first value of the target pixel in the current frame.

In some embodiments, the method may include determining an absolute value of a difference between a filtered value of the reference pixel in the reference frame and a filtered value of the target pixel in the current frame. The method may include determining, based on the absolute value of the difference and a preset relationship between the absolute value of the difference and the weight of the temporal domain filtering operation associated with the reference pixel, the weight of the temporal domain filtering operation associated with the reference pixel in the reference frame. The weight of the temporal domain filtering operation associated with the reference pixel in the reference frame may be in a range of [0, 1]. A larger absolute value of the difference may correspond to a smaller weight of the temporal domain filtering operation associated with the reference pixel in the reference frame.

In some embodiments, the method may include determining, based on a filtered value of the reference pixel in the each reference frame of the plurality of reference frames and a filtered value of the target pixel in the current frame, a noise value. The method may include determining, based on the noise value and a preset relationship between the noise value and the radius of the spatial domain filter, the radius of the spatial domain filter. A larger noise value may correspond to a larger radius of the spatial domain filter.

In some embodiments, the method may include determining, based on a difference between an average value of the filtered values of the reference pixels and the target pixels, and the filtered value of the target pixel in the current frame, the noise value.

In some embodiments, at least one of the filtered value of the reference pixel in the each reference frame of the plurality of reference frame or the filtered value of the target pixel in the current frame may be determined by using a Gauss filter.

In some embodiments, the at least one second image block corresponding to the first image block in each of the group of continuous frames may be determined according to a sum of absolute differences (SAD) algorithm.

According to another aspect of the present disclosure, a system for noise reduction may include at least one storage medium storing a set of instructions, and at least one processor in communication with the at least one storage medium. When executing the stored set of instructions, the at least one processor may cause the system to determine a first image block in each of a group of continuous frames including a current frame and a plurality of reference frames based on coordinates of a target pixel in the current frame. The at least one processor may cause the system to determine at least one second image block corresponding to the first image block in each of the group of continuous frames. The at least one second image block may be similar with the corresponding first image block. The at least one processor may cause the system to determine, based on coordinates of the second image blocks in the group of continuous frames, an average offset between the at least one second image block in the current frame and the second image blocks in the plurality of reference frames. The at least one processor may cause the system to determine, based on the average offset, a spatial domain filtering intensity and a temporal domain filtering intensity for the target pixel in the current frame.

According to another aspect of the present disclosure, a non-transitory computer readable medium may store instructions. The instructions, when executed by at least one processor, may cause the at least one processor to implement a method. The method may include determining a first image block in each of a group of continuous frames including a current frame and a plurality of reference frames based on coordinates of a target pixel in the current frame. The method may include determining at least one second image block corresponding to the first image block in each of the group of continuous frames. The at least one second image block may be similar with the corresponding first image block. The method may include determining, based on coordinates of the second image blocks in the group of continuous frames, an average offset between the at least one second image block in the current frame and the second image blocks in the plurality of reference frames. The method may include determining, based on the average offset, a spatial domain filtering intensity and a temporal domain filtering intensity for the target pixel in the current frame.

According to another aspect of the present disclosure, a system for noise reduction may include a first image block module, a second image block module, an offset determination module, and an intensity determination module. The first image block module may be configured to determine a first image block in each of a group of continuous frames including a current frame and a plurality of reference frames based on coordinates of a target pixel in the current frame. The second image block module may be configured to determine at least one second image block corresponding to the first image block in each of the group of continuous frames. The at least one second image block may be similar with the corresponding first image block. The offset determination module may be configured to determine, based on coordinates of the second image blocks in the group of continuous frames, an average offset between the at least one second image block in the current frame and the second image blocks in the plurality of reference frames. The intensity determination module may be configured to determine, based on the average offset, a spatial domain filtering intensity and a temporal domain filtering intensity for the target pixel in the current frame.

According to another aspect of the present disclosure, a device may include at least one storage medium storing a set of instructions, and at least one processor in communication with the at least one storage medium. When executing the stored set of instructions, the at least one processor causes the system to perform a method. The method may include determining a first image block in each of a group of continuous frames including a current frame and a plurality of reference frames based on coordinates of a target pixel in the current frame. The method may include determining at least one second image block corresponding to the first image block in each of the group of continuous frames. Wherein the at least one second image block may be similar with the corresponding first image block. The method may include determining, based on coordinates of the second image blocks in the group of continuous frames, an average offset between the at least one second image block in the current frame and the second image blocks in the plurality of reference frames. The method may include determining, based on the average offset, a spatial domain filtering intensity and a temporal domain filtering intensity for the target pixel in the current frame.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 12 is schematic diagram illustrating exemplary third image block according to some embodiments of the present disclosure.

DETAILED DESCRIPTION

Figure 1:
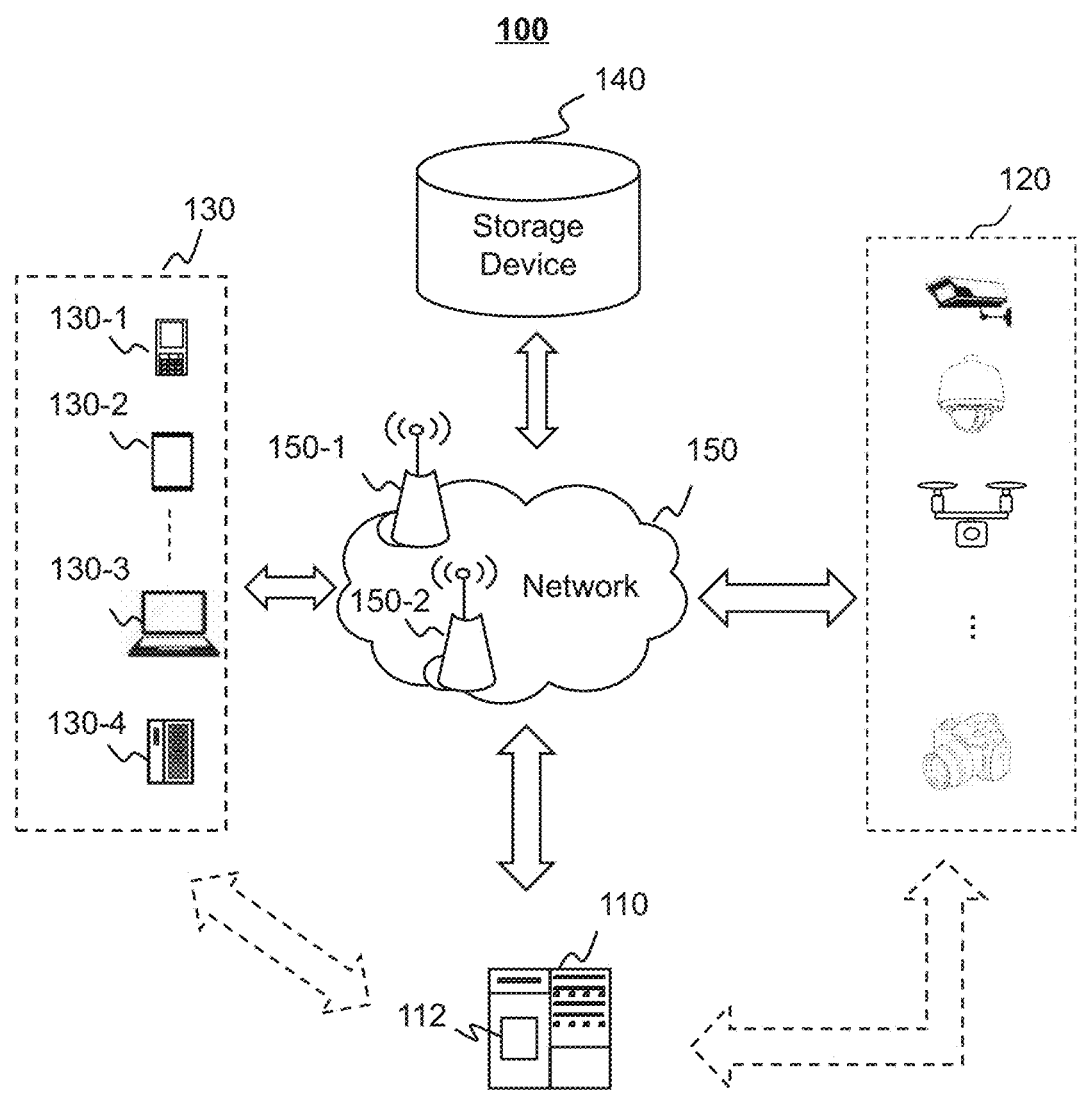
FIG. 1 is a schematic diagram illustrating an exemplary image processing system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order, or simultaneously. Moreover, one or more other operations may be added to the flowcharts. One or more operations may be removed from the flowcharts.

An aspect of the present disclosure relates to systems and methods for noise reduction. As used herein, noise may refer to a set of pixels whose brightness changes abruptly in time and which are spatially distributed randomly (they do not form a set of meaningful geometrical shapes). According to some systems and methods of the present disclosure, the processing engine may determine a first image block in each of a group of continuous frames including a current frame and a plurality of reference frames based on coordinates of a target pixel in the current frame. The processing engine may determine at least one second image block corresponding to the first image block in each of the group of continuous frames. The at least one second image block may be similar with the corresponding first image block. The processing engine may determine, based on coordinates of the second image blocks in the group of continuous frames, an average offset between the at least one second image block in the current frame and the second image blocks in the plurality of reference frames. The average offset may reflect a motion degree of the target pixel. The processing engine may determine, based on the average offset, a spatial domain filtering intensity and a temporal domain filtering intensity for the target pixel in the current frame. The processing engine may perform a spatial domain filtering operation and a temporal domain filtering operation on the target pixel in the current frame based on the spatial domain filtering intensity, the temporal domain filtering intensity, and a spatial domain filter size.

Accordingly, a spatial domain filtering intensity and a temporal domain filtering intensity for each pixel of a plurality of pixels in the current frame may be adjusted based on a motion degree of the pixel. The accuracy of the spatial domain filtering operation and the temporal domain filtering operation performed on the each pixel of the plurality of pixels in the current frame may be improved, and the noise reduction effect of the current frame may further be improved.

FIG. 1 is a schematic diagram illustrating an exemplary image processing system 100 according to some embodiments of the present disclosure. In some embodiments, the image processing system 100 may include a server 110, an image capture device 120, a terminal device 130, a storage device 140, and a network 150. The components of the image processing system 100 may be connected to each other in one or more of various ways. Merely by way of example, the capture device 120 may be connected to the server 110 directly or via the network 150. As another example, the storage device 140 may be connected to the server 110 directly or via the network 150. As a further example, the terminal device 130 may be connected to the server 110 directly or via the network 150.

In some embodiments, the server 110 may be a single server or a server group. The server group may be centralized or distributed (e.g., the server 110 may be a distributed system). In some embodiments, the server 110 may be local or remote. For example, the server 110 may access information and/or data stored in the terminal device 130, the storage device 140, and/or the image capture device 120 via the network 150. As another example, the server 110 may be directly connected to the image capture device 120, the terminal device 130, and/or the storage device 140 to access stored information and/or data. In some embodiments, the server 110 may be implemented on a cloud platform or an onboard computer. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure. In some embodiments, the server 110 may be integrated into the terminal device 130. In some embodiments, the server 110 may be integrated into the image capture device 120.

In some embodiments, the server 110 may include a processing engine 112. The processing engine 112 may process information and/or data to perform one or more functions described in the present disclosure. For example, the processing engine 112 may determine a first image block in each of a group of continuous frames including a current frame and a plurality of reference frames based on coordinates of a target pixel in the current frame. As another example, the processing engine 112 may determine at least one second image block corresponding to a first image block in each of a group of continuous frames. As still another example, the processing engine 112 may determine, based on coordinates of second image blocks in a group of continuous frames, an average offset between at least one second image block in a current frame and second image blocks in a plurality of reference frames. As still another example, the processing engine 112 may determine, based on an average offset, a spatial domain filtering intensity and a temporal domain filtering intensity for a target pixel in a current frame. As still another example, the processing engine 112 may perform a spatial domain filtering operation and a temporal domain filtering operation on a target pixel in a current frame based on a spatial domain filtering intensity, a temporal domain filtering intensity, and a spatial domain filter size. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the server 110 may be connected to the network 150 to communicate with one or more components (e.g., the terminal device 130, the storage device 140, and/or the image capture device 120) of the image processing system 100. In some embodiments, the server 110 may be directly connected to or communicate with one or more components (e.g., the terminal device 130, the storage device 140, and/or the image capture device 120) of the image processing system 100.

The image capture device 120 may be configured to capture one or more images. As used herein, the "image" may refer to a static image, a series of frames, a video, etc. The image may be a two-dimensional image, a three-dimensional image, etc. The image may further include voice information associated with the image. In some embodiments, the image capture device 120 may include a video camera. As used herein, a video camera may refer to an apparatus for visual recording. In some embodiments, the image capture device 120 may include a spherical camera, a hemispherical camera, a rifle camera, etc. In some embodiments, the image capture device 120 may include a black-white camera, a color camera, an infrared camera, an X-ray camera, etc. In some embodiments, the image capture device 120 may include a digital camera, an analog camera, etc. In some embodiments, the image capture device 120 may include a monocular camera, a binocular camera, a multi-camera, etc.

In some embodiments, the captured images may be processed by the image capture device 120 directly. In some embodiments, the image capture device 120 may transmit the captured images to any component (e.g., the server 110, the terminal device 130, the storage device 140) of the image processing system 100 via the network 150 for processing.

In some embodiments, the terminal devices 130 may include a mobile device 130-1, a tablet computer 130-2, a laptop computer 130-3, a telephone 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc.

The storage device 140 may store data and/or instructions. In some embodiments, the storage device 140 may store data obtained from the terminal device 130, the image capture device 120, the processing engine 112, and/or an external storage device. For example, the storage device 140 may store a frame obtained from the image capture device 120. As another example, the storage device 140 may store one or more first image blocks determined by the processing engine 112. As still another example, the storage device 140 may store one or more second image blocks determined by the processing engine 112. As still another example, the storage device 140 may store an average offset determined by the processing engine 112. As still another example, the storage device 140 may store a spatial domain filtering intensity and a temporal domain filtering intensity for a target pixel in a current frame determined by the processing engine 112. In some embodiments, the storage device 140 may store data and/or instructions that the server 110 may execute or use to perform exemplary methods described in the present disclosure. For example, the storage device 140 may store instructions that the processing engine 112 may execute or use to determine a first image block in each of a group of continuous frames including a current frame and a plurality of reference frames based on coordinates of a target pixel in the current frame. As another example, the storage device 140 may store instructions that the processing engine 112 may execute or use to determine at least one second image block corresponding to a first image block in each of a group of continuous frames. As still another example, the storage device 140 may store instructions that the processing engine 112 may execute or use to determine, based on coordinates of second image blocks in a group of continuous frames, an average offset between at least one second image block in a current frame and second image blocks in a plurality of reference frames. As still another example, the storage device 140 may store instructions that the processing engine 112 may execute or use to determine, based on an average offset, a spatial domain filtering intensity and a temporal domain filtering intensity for a target pixel in a current frame.

In some embodiments, the storage device 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 140 may be connected to the network 150 to communicate with one or more components (e.g., the server 110, the terminal device 130, and/or the image capture device 120) of the image processing system 100. One or more components of the image processing system 100 may access the data or instructions stored in the storage device 140 via the network 150. In some embodiments, the storage device 140 may be directly connected to or communicate with one or more components (e.g., the server 110, the terminal device 130, and/or the image capture device 120) of the image processing system 100. In some embodiments, the storage device 140 may be part of the server 110.

The network 150 may facilitate exchange of information and/or data. In some embodiments, one or more components (e.g., the server 110, the terminal device 130, the storage device 140, or the image capture device 120) of the image processing system 100 may send information and/or data to other component(s) of the image processing system 100 via the network 150. For example, the server 110 may obtain/acquire one or more frames from one or more image capture devices 120 (e.g., a camera). In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 150 may include one or more network access points. For example, the network 150 may include wired or wireless network access points (e.g., 150-1, 150-2), through which one or more components of the image processing system 100 may be connected to the network 150 to exchange data and/or information.

It should be noted that the image processing system 100 is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the image processing system 100 may further include a database, an information source, etc. As another example, the image processing system 100 may be implemented on other devices to realize similar or different functions.

Figure 2:
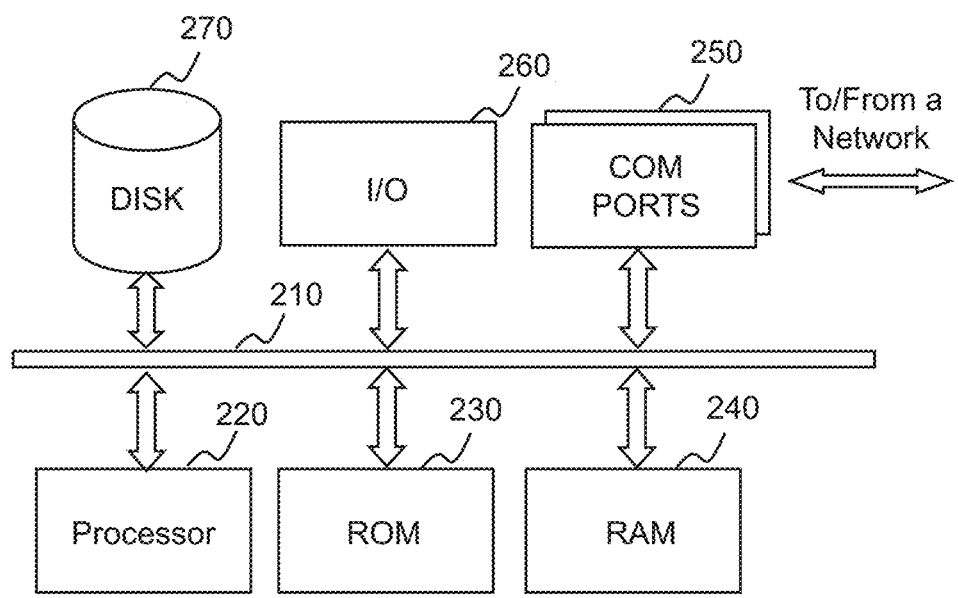
FIG. 2 is a schematic diagram illustrating exemplary hardware and/or software components of an exemplary computing device according to some embodiments of the present disclosure.

FIG. 2 is a schematic diagram illustrating exemplary hardware and/or software components of an exemplary computing device according to some embodiments of the present disclosure. In some embodiments, the server 110, the terminal device 130 may be implemented on the computing device 200. For example, the processing engine 112 may be implemented on the computing device 200 and configured to perform functions of the processing engine 112 disclosed in this disclosure.

The computing device 200 may be used to implement any component of the image processing system 100 as described herein. For example, the processing engine 112 may be implemented on the computing device 200, via its hardware, software program, firmware, or a combination thereof. Although only one such computer is shown, for convenience, the computer functions relating to the image processing as described herein may be implemented in a distributed fashion on a number of similar platforms to distribute the processing load.

The computing device 200 may include COM ports 250 connected to and from a network connected thereto to facilitate data communications. The computing device 200 may also include a processor 220, in the form of one or more, e.g., logic circuits, for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, a read only memory (ROM) 230, or a random access memory (RAM) 240, for storing various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is described in FIG. 2. Multiple processors are also contemplated, thus operations and/or steps performed by one processor as described in the present disclosure may also be jointly or separately performed by the multiple processors. For example, if in the present disclosure the processor of the computing device 200 executes both operation A and operation B, it should be understood that operation A and operation B may also be performed by two different CPUs and/or processors jointly or separately in the computing device 200 (e.g., the first processor executes operation A and the second processor executes operation B, or the first and second processors jointly execute operations A and B).

Figure 3:
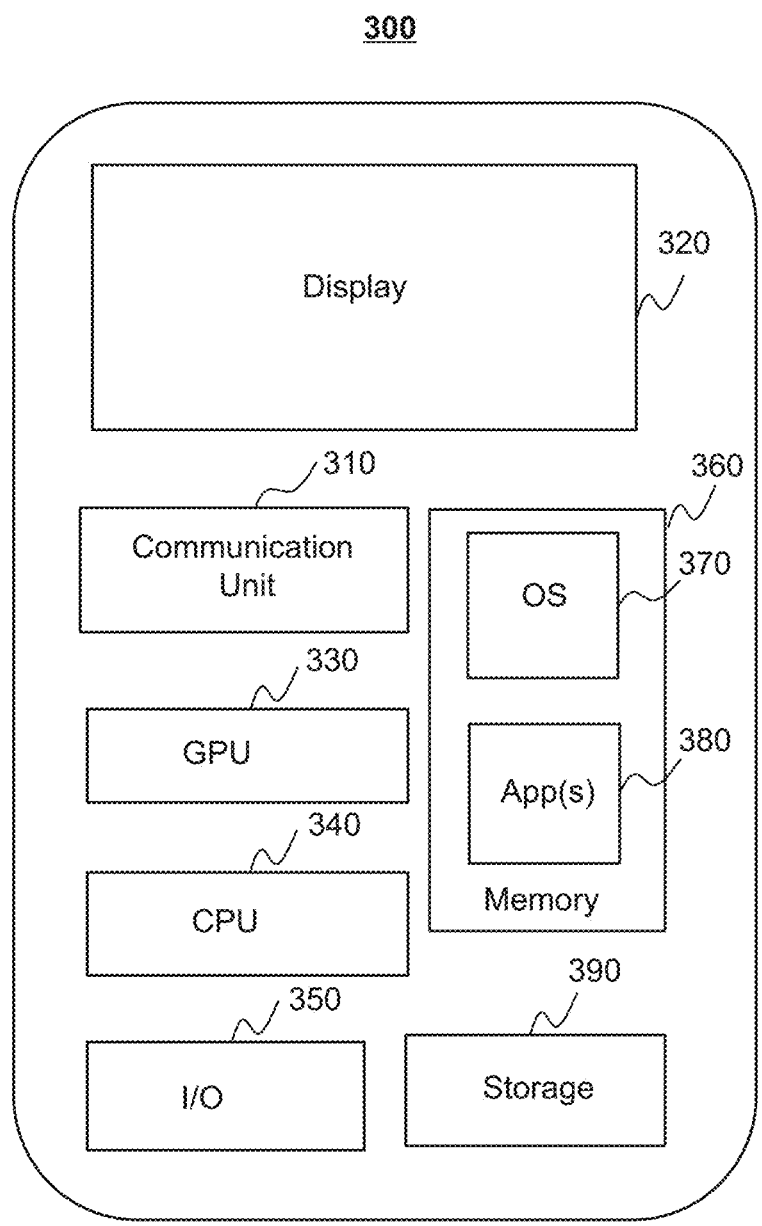
FIG. 3 is a schematic diagram illustrating exemplary hardware and/or software components of an exemplary mobile device on which a terminal device may be implemented according to some embodiments of the present disclosure.

FIG. 3 is a schematic diagram illustrating exemplary hardware and/or software components of an exemplary mobile device according to some embodiments of the present disclosure. In some embodiments, the terminal device 130 may be implemented on the mobile device 300. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile app for receiving and rendering information relating to image processing or other information from the image processing system 100. User interactions with the information stream may be achieved via the I/O 350 and provided to the processing engine 112 and/or other components of the image processing system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
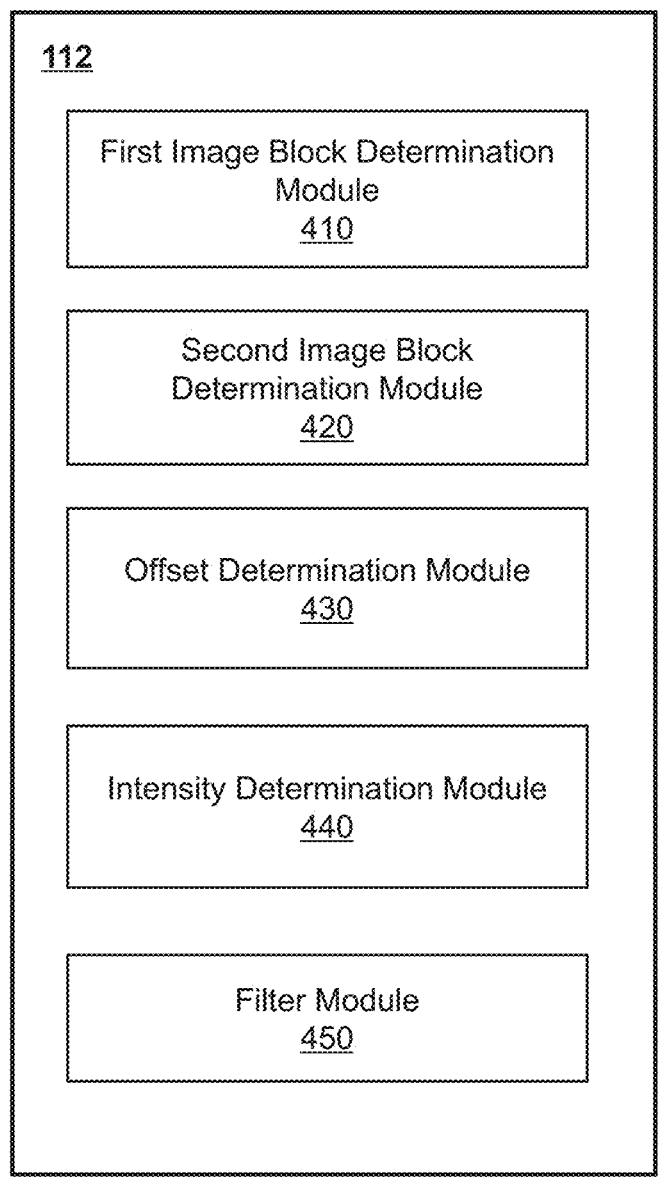
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include a first image block determination module 410, a second image block determination module 420, an offset determination module 430, an intensity determination module 440, and a filter module 450.

The first image block determination module 410 may be configured to determine a first image block in a frame. For example, the first image block determination module 410 may determine a first image block in each of a group of continuous frames including a current frame and a plurality of reference frames based on coordinates of a target pixel in the current frame. More descriptions of the determination of the first image block may be found elsewhere in the present disclosure (e.g., operation 510 in FIG. 5, and descriptions thereof).

The second image block determination module 420 may be configured to determine a second image block in a frame. In some embodiments, the second image block determination module 420 may determine at least one second image block corresponding to a first image block in each of a group of continuous frames. The at least one second image block may be similar with the corresponding first image block. In some embodiments, the second image block determination module 420 may determine the at least one second image block corresponding to the first image block in the each of the group of continuous frames according to an image matching algorithm as described elsewhere in the present disclosure.

The offset determination module 430 may be configured to determine an average offset between one or more image blocks in a first frame and the one or more image blocks in a second frame. In some embodiments, the offset determination module 430 may determine an average offset between at least one second image block in a current frame and second image blocks in a plurality of reference frames based on coordinates of second image blocks in a group of continuous frames. For example, the offset determination module 430 may determine an average offset between at least one second image block in a current frame and second image blocks in a plurality of reference frames according to Equations (1)-(3) as described in connection with operation 530.

The intensity determination module 440 may be configured to determine a spatial domain filtering intensity and/or a temporal domain filtering intensity. In some embodiments, the intensity determination module 440 may determine a spatial domain filtering intensity and a temporal domain filtering intensity for a target pixel in a current frame based on an average offset. For example, the intensity determination module 440 may determine a spatial domain filtering intensity for a target pixel in a current frame according to Equation (4) as described in connection with operation 540. The intensity determination module 440 may determine a temporal domain filtering intensity for a target pixel in a current frame according to Equation (5) as described in connection with operation 540.

The filter module 450 may be configured to perform a filtering operation on a frame. In some embodiments, the filter module 450 may perform a spatial domain filtering operation and a temporal domain filtering operation on a target pixel in a current frame based on a spatial domain filtering intensity, a temporal domain filtering intensity, and a spatial domain filter size. More descriptions of the spatial domain filtering operation and the temporal domain filtering operation may be found elsewhere in the present disclosure (e.g., FIG. 6, and descriptions thereof).

The modules in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. In some embodiments, one or more modules may be combined into a single module. For example, the first image block determination module 410 and the second image block determination module 420 may be combined as a single module which may both determine a first image block and determine at least one second image block in each of a group of continuous frames. In some embodiments, one or more modules may be added. For example, the processing engine 112 may further include a storage module (not shown) used to store information and/or data (e.g., a current frame, a reference frame, a first image block, a second image block, a target pixel, a spatial domain filtering intensity, a temporal domain filtering intensity) associated with the image processing system 100. As another example, the processing engine 112 may further include an obtaining module (not shown) used to obtain a group of continuous frames.

Figure 5:
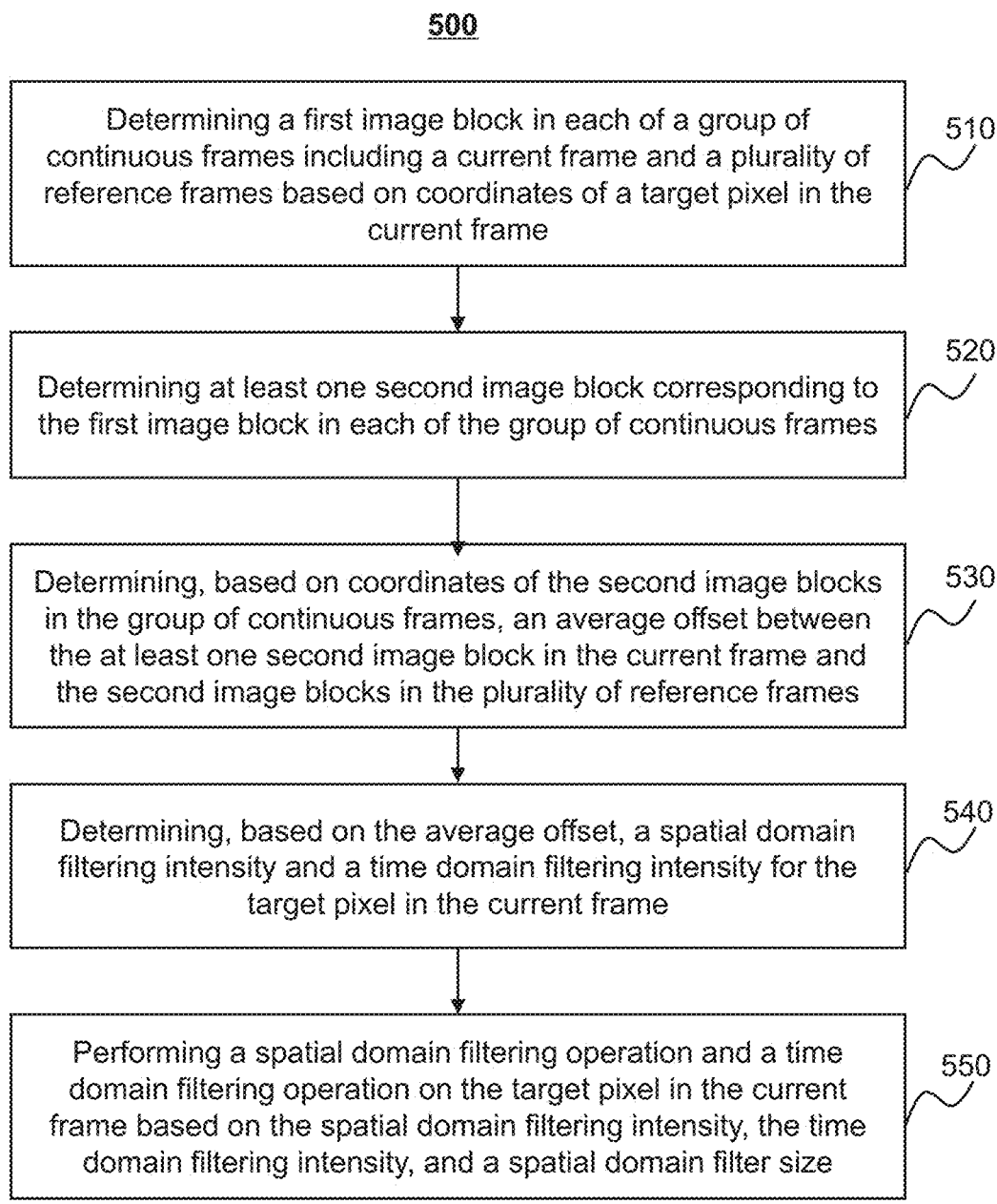
FIG. 5 is a flowchart illustrating an exemplary process for noise reduction according to some embodiments of the present disclosure.

FIG. 5 is a flowchart illustrating an exemplary process for noise reduction according to some embodiments of the present disclosure. The process 500 may be executed by the image processing system 100. For example, the process 500 may be implemented as a set of instructions stored in the storage 220. The processor 210 and/or the modules in FIG. 4 may execute the set of instructions, and when executing the instructions, the processor 210 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process 500 as illustrated in FIG. 5 and described below is not intended to be limiting.

In 510, the processing engine 112 (e.g., the first image block determination module 410) may determine a first image block in each of a group of continuous frames including a current frame and a plurality of reference frames based on coordinates of a target pixel in the current frame.

As used herein, a frame (also referred to as a sequence) may refer to a particular image or other discrete unit within a video. In some embodiments, the processing engine 112 may obtain the group of continuous frames from an image capture device (e.g., the image capture device 120) periodically (e.g., per second, per 2 seconds, per 5 seconds, per 10 seconds) or in real time. In some embodiments, during the capturing of frames, the image capture device 120 may transmit a plurality of frames to a storage device (e.g., the storage device 140) periodically (e.g., per second, per 2 seconds, per 5 seconds, per 10 seconds) or in real time via the network 150. Further, the processing engine 112 may access the storage device and retrieve the group of continuous frames.

The group of continuous frames may include a current frame and a plurality of reference frames. As used herein, a current frame may refer to a frame that needs to be processed (e.g., denoise) by the image processing system 100. A number (or a count) of frames in the group of continuous frames may be set manually by a user, or be determined by one or more components of the image processing system 100 according to default settings. In some embodiments, the number of frames in the group of continuous frames may be an integer not less than 1 ($S \geq 1$). For example, S may be 9, 11, 21, or the like.

In some embodiments, the processing engine 112 may determine S−1 sequential frames prior to the current frame as the reference frames. In some embodiments, the processing engine 112 may determine S−1 sequential frames after the current frame as the reference frames. In some embodiments, the processing engine 112 may determine M sequential frames prior to the current frame and K sequential frames after the current frame as the reference frames (M+K=S−1). M may be the same as or different from K. In some embodiments, if a number (or a count) of frames prior to the current frame is not less than a half of the number of frames in the group of continuous frames, and a number (or a count) of frames after the current frame is not less than the half of the number of frames in the group of continuous frames, the processing engine 112 may determine that M is equal to K, or a difference between M and K is not greater than 1, which may ensure a good noise reduction effect. For example, assuming that the number of frames in the group of continuous frames is 21, and frame 060 is a current frame, the processing engine 112 may determine frames 050 to 070 as the group of continuous frames. That is, the processing engine 112 may determine frames 050 to 059, and frames 061 to 070 as the plurality of reference frames.

The processing engine 112 may determine a first image block in each of the group of continuous frames based on the coordinates of the target pixel in the current frame. As used herein, a target pixel in a current frame may refer to a pixel that needs to be processed (e.g., denoise) in the current frame. The first image block in the current frame may include the target pixel. For example, the target pixel may be located in the center of the first image block in the current frame. As another example, the target pixel may be located at an edge of the first image block in the current frame. In some embodiments, a size of the first image block may be E pixels×F pixels. E (or F) may be any positive number, for example, 2, 3, 5, 10, etc. E may be the same as or different from F.

Figure 7A:
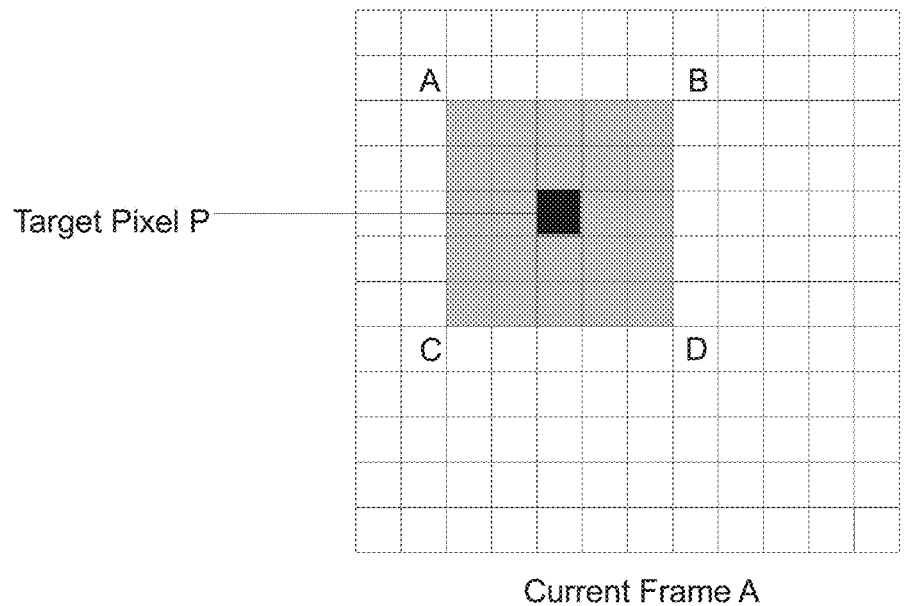
FIG. 7A and FIG. 7B are schematic diagrams illustrating exemplary first image blocks according to some embodiments of the present disclosure.
Figure 7B:
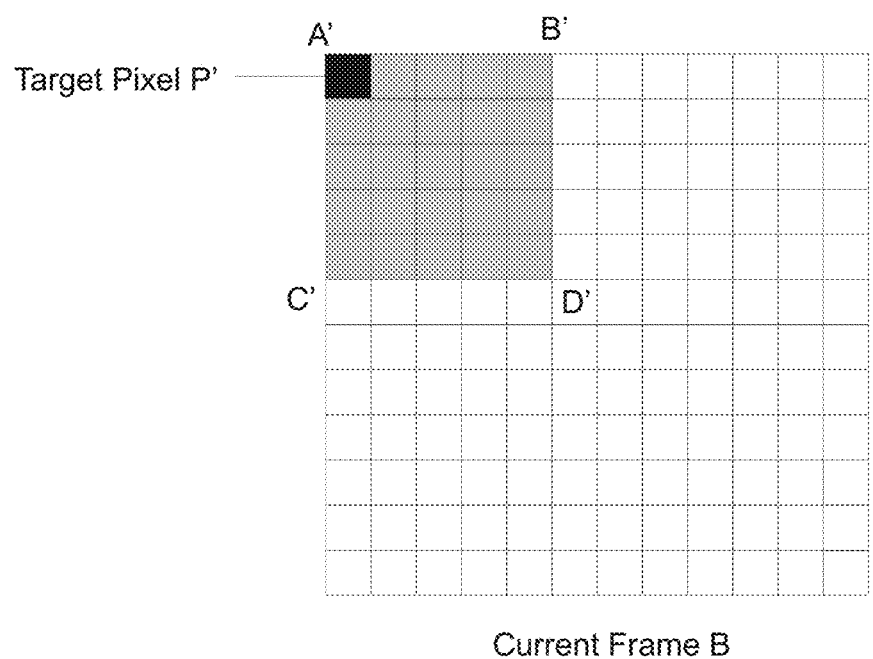

FIG. 7A and FIG. 7B are schematic diagrams illustrating exemplary first image blocks according to some embodiments of the present disclosure. As shown in FIG. 7A, a first image block ABCD with a size of 5 pixels×5 pixels is determined in a current frame A. A target pixel P is located in the center of the first image block ABCD. As shown in FIG. 7B, a first image block A'B'C'D' with a size of 5 pixels×5 pixels is determined in a current frame B. A target pixel P' is located at an upper left corner of the first image block A'B'C'D'.

In some embodiments, the processing engine 112 may determine a reference pixel in each reference frame of the plurality of reference frames based on the coordinates of the target pixel in the current frame. The coordinates of the target pixel in the current image may be the same as the coordinates of the reference pixel in the each reference frame of the plurality of reference frames. The processing engine 112 may determine the first image block in the each reference frame of the plurality of reference frames based on the corresponding reference pixel in the each reference frame. The first image block in the reference frame may include the corresponding reference pixel. In some embodiments, a location of the reference pixel in the corresponding reference frame may be the same as the location of the target pixel in the current frame.

In 520, the processing engine 112 (e.g., the second image block determination module 420) may determine at least one second image block corresponding to the first image block in each of the group of continuous frames.

The at least one second image block may be similar with the corresponding first image block. As used herein, "a second image block is similar with a first image block" may refer to that a similarity (e.g., grayscale-based, feature-based) between the second image block and the first image block is greater than a preset threshold.

In some embodiments, the processing engine 112 may determine the at least one second image block corresponding to the first image block in the each of the group of continuous frames according to an image matching algorithm. Exemplary image matching algorithms may include a sum of absolute differences (SAD) algorithm, a mean absolute differences (MAD), a sum of squared differences (SSD), a mean square differences (MSD), a normalized cross correlation (NCC), a sequential similarity detection algorithm (SSDA), a sum of absolute transformed difference (SATD), or the like.

In some embodiments, the processing engine 112 may determine a ranking of a plurality of second image blocks in the each of the group of continuous frames based on a similarity between each second image block of the plurality of second image blocks and the corresponding first image block in the each of the group of continuous frames. For example, the processing engine 112 may rank the plurality of second image blocks in the each of the group of continuous frames based on the similarity between the each second image block of the plurality of second image blocks and the corresponding first image block in the each of the group of continuous frames in a descending order.

Figure 8:
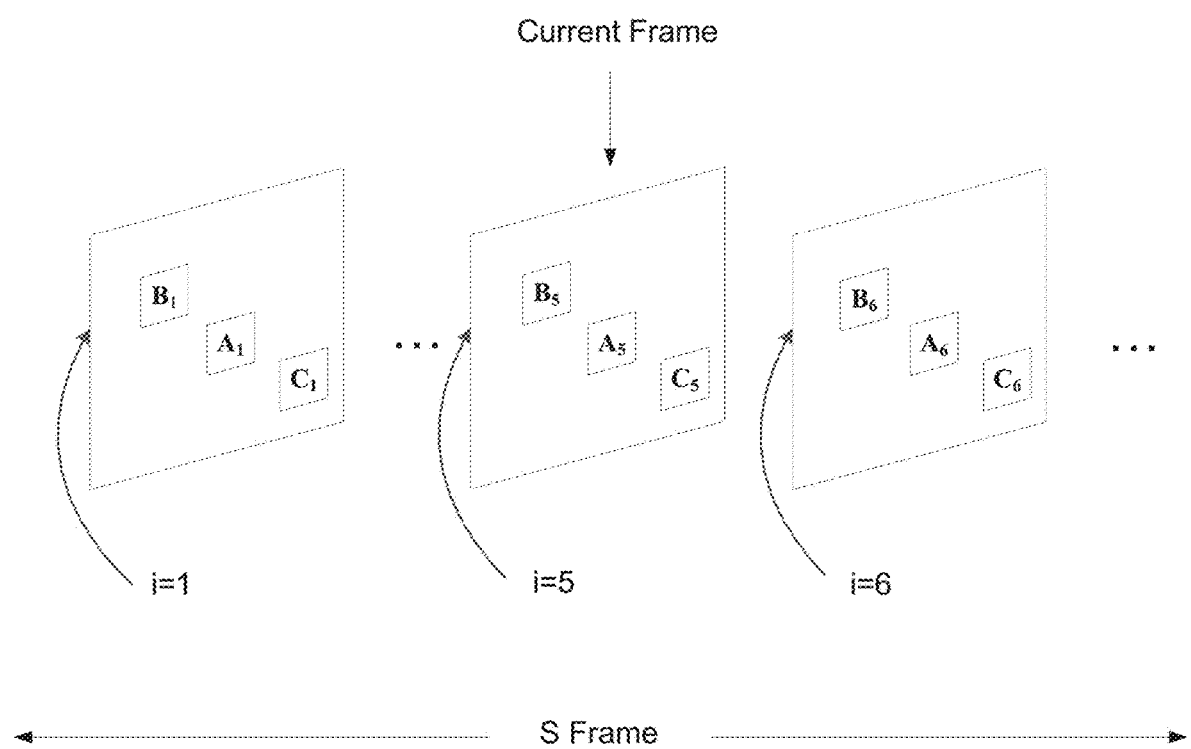
FIG. 8 is a schematic diagram illustrating exemplary first image blocks and second image blocks according to some embodiments of the present disclosure.

FIG. 8 is a schematic diagram illustrating exemplary first image blocks and second image blocks according to some embodiments of the present disclosure. As shown in FIG. 8, a group of continuous frames includes S frames. The fifth frame (i=5) in the group of continuous frames is a current frame. A1, A5, and A6 refer to first image blocks in the first frame, the fifth frame (i.e., the current frame), and the sixth frame, respectively. B1, C1, B5, C5, B6 and C6 refer to second image blocks in the first frame, the fifth frame (i.e., the current frame), and the sixth frame, respectively. A similarity between B1 and A1 (or a similarity between B5 and A5, a similarity between B6 and A6) may be larger than a similarity between C1 and A1 (or a similarity between C5 and A5, a similarity between C6 and A6).

In 530, the processing engine 112 (e.g., the offset determination module 430) may determine, based on coordinates of the second image blocks in the group of continuous frames, an average offset between the at least one second image block in the current frame and the second image blocks in the plurality of reference frames.

The average offset between the at least one second image block in the current frame and the second image blocks in the plurality of reference frames may reflect a similarity between surrounding information of the target pixel and surrounding information of the plurality of reference pixels, and accordingly reflect a similarity between the target pixel in the current frame and the plurality of reference pixels in the plurality of reference frames. For example, a smaller average offset may correspond to a larger similarity between surrounding information of the target pixel and surrounding information of the plurality of reference pixels, and accordingly correspond to a larger similarity between the target pixel in the current frame and the reference pixels in the plurality of reference frames. That is, the target pixel may tend to be stationary in a temporal domain, indicating that a larger temporal domain filtering intensity needs to be used when a filtering operation is performed on the target pixel in the current frame. A larger average offset may correspond to a smaller similarity between surrounding information of the target pixel and surrounding information of the plurality of reference pixels, and accordingly correspond to a smaller similarity between the target pixel in the current frame and the reference pixels in the plurality of reference frames. That is, the target pixel may tend to be motive in the temporal domain, indicating that a larger spatial domain filtering intensity needs to be used when a filtering operation is performed on the target pixel in the current frame.

In some embodiments, the processing engine 112 may determine the average offset between the at least one second image block in the current frame and the second image blocks in the plurality of reference frames based on the coordinates of the second image blocks in the group of continuous frames. For example, assuming that a number (or a count) of the second image blocks in the each of the group of continuous frames is 1 (e.g., a second image block B in the current frame, a second image block $B_i$ in each reference frame of a plurality of reference frames), the processing engine 112 may determine the average offset between the second image block in the current frame and the second image blocks in the plurality of reference frames according to Equation (1):

$$Diff_{POS} = \frac{\sum_{i=0}^{S} \sqrt{(B_x - B_{i,x})^2 + (B_y - B_{i,y})^2}}{S} \quad (1)$$

where $Diff_{POS}$ refers to an average offset; S refers to a number (or a count) of frames in a group of continuous frames; $B_x$ refers to a X-axis coordinate of a second image block (i.e., the second image block B) in a current frame; $B_y$ refers to a Y-axis coordinate of the second image block (i.e., the second image block B) in the current frame; $B_{i,x}$ refers to a X-axis coordinate of a second image block (i.e., the second image block $B_i$) in a i-th frame in the group of continuous frames; and $B_{i,y}$ refers to a Y-axis coordinate of the second image block (i.e., the second image block $B_i$) in the i-th frame in the group of continuous frames.

As another example, assuming that the number of the second image blocks in the each of the group of continuous frames is 2 (e.g., a second image block B and a second image block C in a current frame, a second image block $B_i$ and a second image block $C_i$ in each reference frame of a plurality of reference frames), the processing engine 112 may determine the average offset between the second image block in the current frame and the second image blocks in the plurality of reference frames according to Equation (2):

$$Diff_{POS} = \frac{\sum_{i=0}^{S} \sqrt{(B_x - B_{i,x})^2 + (B_y - B_{i,y})^2} + \sqrt{(C_x - C_{i,x})^2 + (C_y - C_{i,y})^2}}{2 \times S} \quad (2)$$

where $Diff_{POS}$ refers to an average offset; S refers to a number (or a count) of frames in a group of continuous frames; $B_x$ refers to a X-axis coordinate of a second image block (i.e., the second image block B) in a current frame; $B_y$ refers to a Y-axis coordinate of the second image block (i.e., the second image block B) in the current frame; $B_{i,x}$ refers to a X-axis coordinate of a second image block (i.e., the second image block $B_i$) in a i-th frame in the group of continuous frames; $B_{i,y}$ refers to a Y-axis coordinate of the second image block (i.e., the second image block $B_i$) in the i-th frame in the group of continuous frames; $C_x$ refers to a X-axis coordinate of a second image block (i.e., the second image block C) in a current frame; $C_y$ refers to a Y-axis coordinate of the second image block (i.e., the second image block C) in the current frame; $C_{i,x}$ refers to a X-axis coordinate of a second image block (i.e., the second image block $C_i$) in the i-th frame in the group of continuous frames; and $C_{i,y}$ refers to a Y-axis coordinate of the second image block (i.e., the second image block $C_i$) in the i-th frame in the group of continuous frames.

As still another example, assuming that the number of the second image blocks in the each of the group of continuous frames is H (e.g., a second image block B, a second image block C, a second image block D, . . . in a current frame, a second image block $B_i$, a second image block $C_i$, a second image block $D_i$, . . . in each reference frame of a plurality of reference frames), the processing engine 112 may determine the average offset between the second image block in the current frame and the second image blocks in the plurality of reference frames according to Equation (3):

$$Diff_{POS} = \quad (3)$$

$$\frac{\sum_{i=0}^{S} \sqrt{(B_x - B_{i,x})^2 + (B_y - B_{i,y})^2} + \sqrt{(C_x - C_{i,x})^2 + (C_y - C_{i,y})^2} + \sqrt{(D_x - D_{i,x})^2 + (D_y - D_{i,y})^2} + \ldots}{H \times S}$$

where $Diff_{POS}$ refers to an average offset; S refers to a number (or a count) of frames in a group of continuous frames; H refers to a number (or a count) of second image blocks in each of the group of continuous frames; $B_x$ refers to a X-axis coordinate of a second image block (i.e., the second image block B) in a current frame; $B_y$ refers to a Y-axis coordinate of the second image block (i.e., the second image block B) in the current frame; $B_{i,x}$ refers to a X-axis coordinate of a second image block (i.e., the second image block $B_i$) in a i-th frame in the group of continuous frames; $B_{i,y}$ refers to a Y-axis coordinate of the second image block (i.e., the second image block $B_i$) in the i-th frame in the group of continuous frames; $C_x$ refers to a X-axis coordinate of a second image block (i.e., the second image block C) in a current frame; $C_y$ refers to a Y-axis coordinate of the second image block (i.e., the second image block C) in the current frame; $C_{i,x}$ refers to a X-axis coordinate of a second image block (i.e., the second image block $C_i$) in the i-th frame in the group of continuous frames; $C_{i,y}$ refers to a Y-axis coordinate of the second image block (i.e., the second image block $C_i$) in the i-th frame in the group of continuous frames; $D_x$ refers to a X-axis coordinate of a second image block (i.e., the second image block D) in a current frame; $D_y$ refers to a Y-axis coordinate of the second image block (i.e., the second image block D) in the current frame; $D_{i,x}$ refers to a X-axis coordinate of a second image block (i.e., the second image block $D_i$) in the i-th frame in the group of continuous frames; and $D_{i,y}$ refers to a Y-axis coordinate of the second image block (i.e., the second image block $D_i$) in the i-th frame in the group of continuous frames.

In 540, the processing engine 112 (e.g., the intensity determination module 440) may determine, based on the average offset, a spatial domain filtering intensity and a temporal domain filtering intensity for the target pixel in the current frame. In some embodiments, a larger average offset may correspond to a larger spatial domain filtering intensity and a smaller temporal domain filtering intensity.

Figure 9:
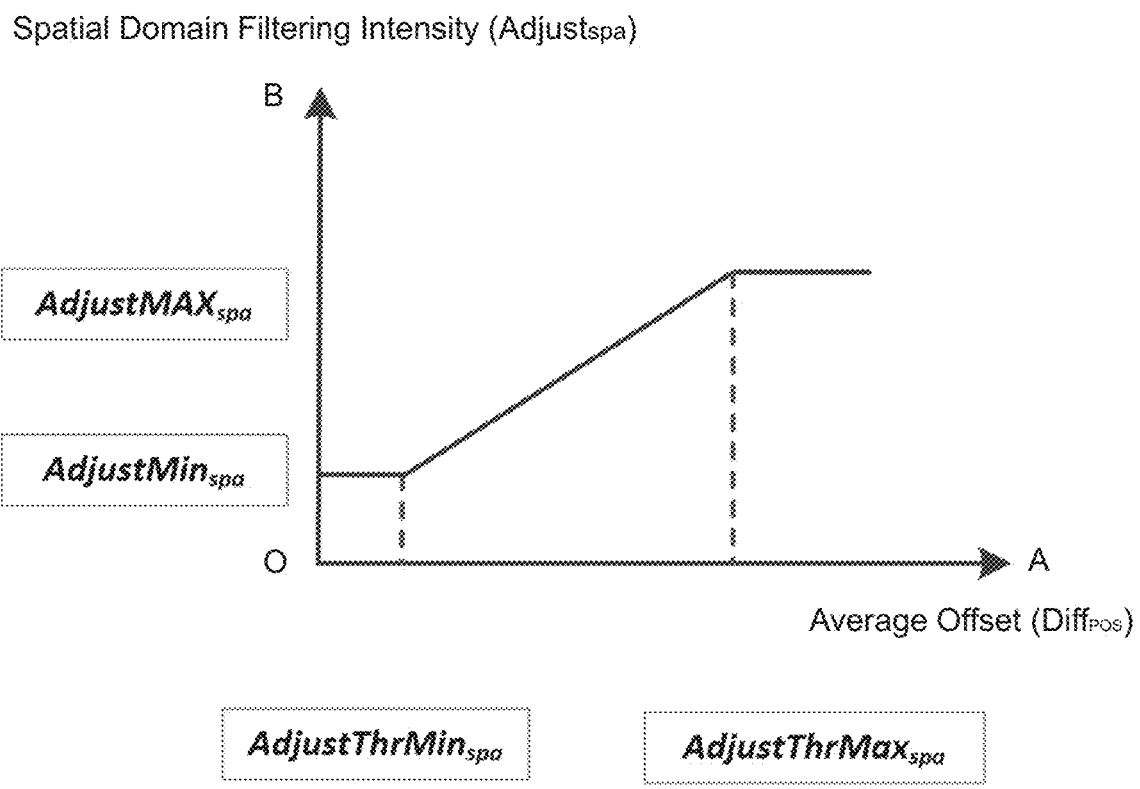
FIG. 9 is a schematic diagram illustrating a spatial domain filtering intensity according to some embodiments of the present disclosure.

FIG. 9 is a schematic diagram illustrating a spatial domain filtering intensity according to some embodiments of the present disclosure. As shown in FIG. 9, OA may correspond to an average offset and OB may correspond to a spatial domain filtering intensity. The spatial domain filtering intensity for the target pixel in the current frame may be determined based on the average offset according to a sectioned function. In some embodiments, the processing engine 112 may determine the spatial domain filtering intensity for the target pixel in the current frame according to Equation (4):

$$Adjust_{spa} = \quad (4)$$

$$\begin{cases} AdjustMin_{spa} & (Diff_{POS} \leq AdjustThrMin_{spa}) \\ \frac{AdjustThrMin_{spa} - Diff_{POS}}{AdjustThrMin_{spa} - AdjustThrMax_{spa}} \times \\ (AdjustMax_{spa} - AdjustMin_{spa}) + AdjustMin_{spa} \\ & (AdjustThrMin_{spa} < Diff_{POS} \leq AdjustThrMax_{spa}) \\ AdjustMax_{spa} & (Diff_{POS} > AdjustThrMax_{spa}) \end{cases}$$

where $Adjust_{spa}$ refers to a spatial domain filtering intensity; $Diff_{POS}$ refers to an average offset; and $AdjustMin_{spa}$, $AdjustMax_{spa}$, $AdjustThrMin_{spa}$, and $AdjustThrMax_{spa}$ refer to constants, $0 \leq AdjustMin_{spa} \leq AdjustMax_{spa}$, and $0 \leq AdjustThrMin_{spa} \leq AdjustThrMax_{spa}$.

Figure 10:
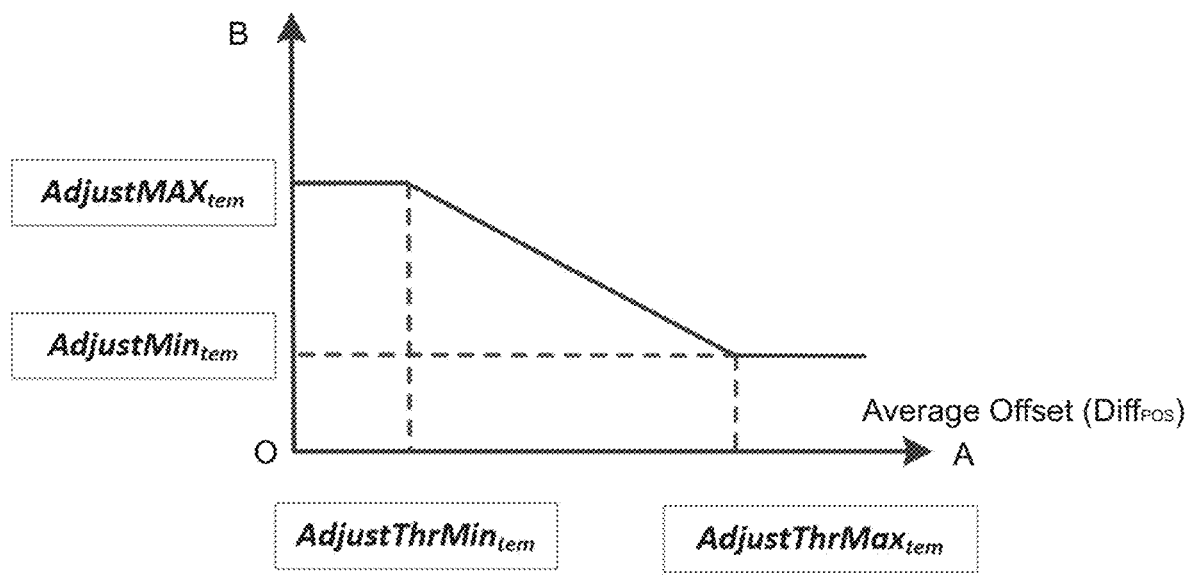
FIG. 10 is a schematic diagram illustrating a temporal domain filtering intensity according to some embodiments of the present disclosure.

FIG. 10 is a schematic diagram illustrating a temporal domain filtering intensity according to some embodiments of the present disclosure. As shown in FIG. 10, OA may correspond to an average offset and OB may correspond to a temporal domain filtering intensity. The temporal domain filtering intensity for the target pixel in the current frame may be determined based on the average offset according to a sectioned function. In some embodiments, the processing engine 112 may determine the temporal domain filtering intensity for the target pixel in the current frame according to Equation (5):

$$Adjust_{tem} = \begin{cases} AdjustMax_{tem} & (Diff_{POS} \leq AdjustThrMin_{tem}) \\ \dfrac{AdjustThrMax_{tem} - Diff_{POS}}{AdjustThrMax_{tem} - AdjustThrMin_{tem}} \times \\ (AdjustMax_{spa} - AdjustMin_{spa}) + AdjustMin_{spa} \\ & (AdjustThrMin_{tem} < Diff_{POS} \leq AdjustThrMax_{tem}) \\ AdjustMin_{tem} & (Diff_{POS} > AdjustThrMax_{tem}) \end{cases} \quad (5)$$

where $Adjust_{tem}$ refers to a temporal domain filtering intensity; $Diff_{POS}$ refers to an average offset; and $AdjustMin_{tem}$, $AdjustMax_{tem}$, $AdjustThrMin_{tem}$, and $AdjustThrMax_{tem}$ refer to constants, $0 \leq AdjustMin_{tem} \leq AdjustMax_{tem}$, and $0 \leq AdjustThrMin_{tem} \leq AdjustThrMax_{tem}$.

In 550, the processing engine 112 (e.g., the filter module 450) may perform a spatial domain filtering operation and a temporal domain filtering operation on the target pixel in the current frame based on the spatial domain filtering intensity, the temporal domain filtering intensity, and a spatial domain filter size.

As used herein, the spatial domain filtering may be a neighborhood operation, in which a value of any given pixel in an output image is determined by applying some algorithm to values of pixels in the neighborhood of the corresponding input pixel. The temporal domain filtering may estimate a motion of an object in each frame of a group of continuous frames and eliminate noise using inter frame relations. A combination of the spatial domain filtering operation and the temporal domain filtering operation may use spatial neighbors of the processed pixel as well as its equivalents in other frames.

In some embodiments, the processing engine 112 may perform the spatial domain filtering operation on the target pixel in the current frame based on the spatial domain filtering intensity and the spatial domain filter size, to determine a first value of the target pixel in the current frame. The processing engine 112 may perform the temporal domain filtering operation on the target pixel in the current frame based on the temporal domain filtering intensity, the first value of the target pixel in the current frame, and a first value of a reference pixel in each reference frame of the plurality of reference frames, to determine a second value of the target pixel in the current frame. More descriptions of the spatial domain filtering operation and the temporal domain filtering operation may be found elsewhere in the present disclosure (e.g., FIG. 6, and descriptions thereof).

In some embodiments, for each pixel of a plurality of pixels in the current frame, the processing engine 112 may process the pixel according to process 500 to reduce noise in the current frame. In some embodiments, the processing engine 112 may process all pixels in the current frame or a part thereof. In some embodiments, process 500 may be performed to all the pixels of the current frame as a whole, or to every pixel in the current frame individually.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added in process 500. For example, an operation for obtaining a group of continuous of frames may be added before operation 510.

Figure 6:
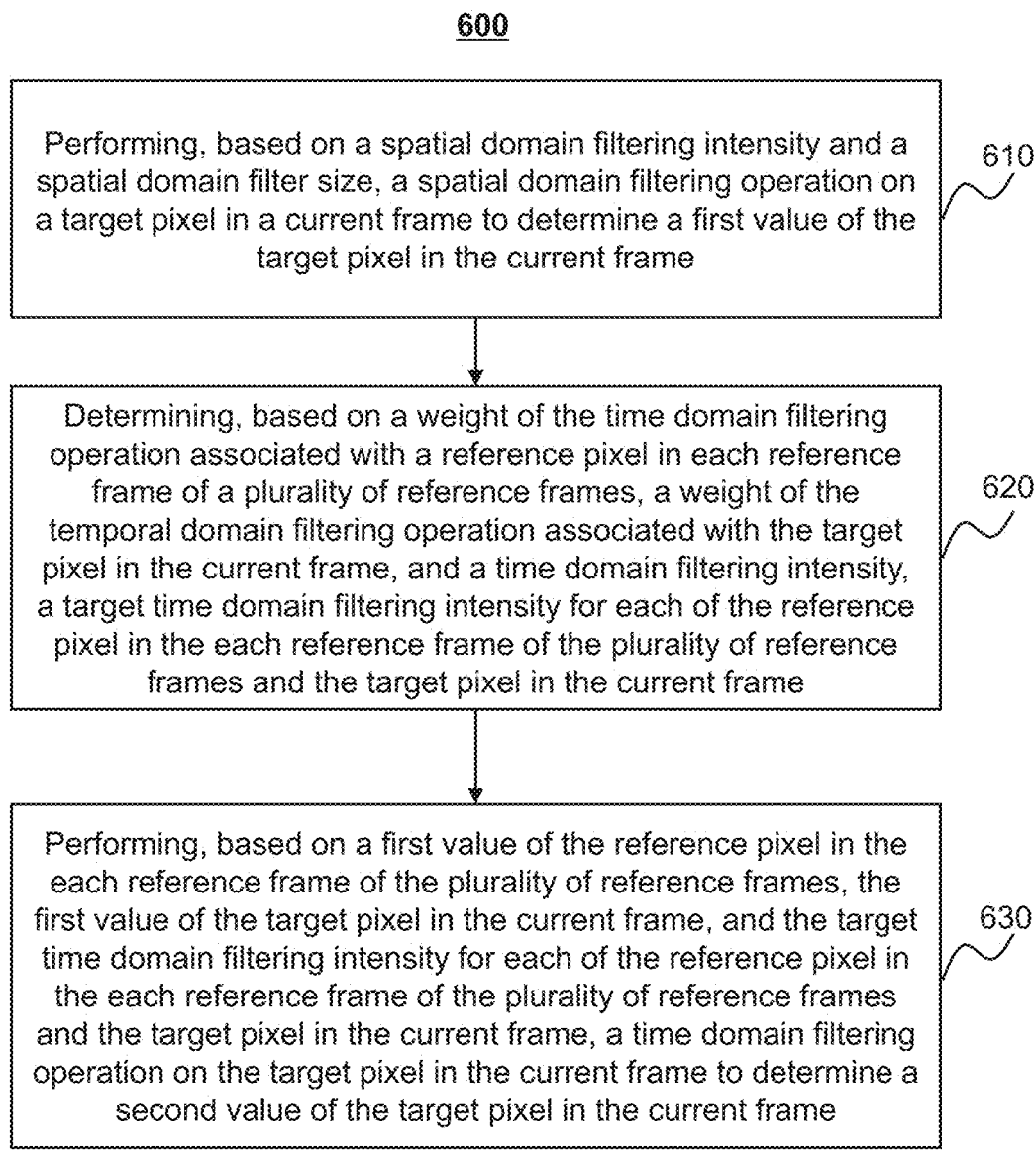
FIG. 6 is a flowchart illustrating an exemplary process for performing a filtering operation on a target pixel in a current frame according to some embodiments of the present disclosure.

FIG. 6 is a flowchart illustrating an exemplary process for performing a filtering operation on a target pixel in a current frame according to some embodiments of the present disclosure. The process 600 may be executed by the image processing system 100. For example, the process 600 may be implemented as a set of instructions stored in the storage 220. The processor 210 and/or the modules in FIG. 4 may execute the set of instructions, and when executing the instructions, the processor 210 and/or the modules may be configured to perform the process 600. The operations of the illustrated process presented below are intended to be illustrative. In some embodiments, the process 600 may be accomplished with one or more additional operations not described and/or without one or more of the operations discussed. Additionally, the order in which the operations of the process 600 as illustrated in FIG. 6 and described below is not intended to be limiting.

In 610, the processing engine 112 (e.g., the filter module 450) may perform, based on a spatial domain filtering intensity and a spatial domain filter size, a spatial domain filtering operation on a target pixel in a current frame to determine a first value of the target pixel in the current frame.

In some embodiments, the processing engine 112 may perform the spatial domain filtering operation on the target pixel in the current frame based on the spatial domain filtering intensity and the spatial domain filter size. In some embodiments, the spatial domain filter size may include a radius of the spatial domain filter. In some embodiments, the processing engine 112 may determine the radius of the spatial domain filter based on a noise value associated with the target pixel. As used herein, the noise value may reflect a difference between a value of the target pixel in the current frame and an average value of values of the target pixel in the current and the reference pixels in the plurality of reference frames. The processing engine 112 may determine the noise value based on a filtered value of a reference pixel in each reference frame of a plurality of reference frames and a filtered value of the target pixel in the current frame. For example, the processing engine 112 may determine the noise value based on a difference between an average value of the filtered values of the reference pixels and the target pixel, and the filtered value of the target pixel in the current frame. In some embodiments, the filtered value of the reference pixel in the each reference frame of the plurality of reference frame or the filtered value of the target pixel in the current frame may be determined by using a Gauss filter. In some embodiments, the noise value may be determined according to Equation (6):

$$Noise = \left| GauFilter\left(F_0 - \dfrac{\sum_{t=1}^{s} F_t}{s}\right) \right| \quad (6)$$

where Noise refers to a noise value; GauFilter refers to a Gauss filter operation; $F_0$ refers to a value of a target pixel in a current frame; $F_t$ refers to a value of a pixel (e.g., a target pixel, a reference pixel) in a t-th frame in a group of continuous frames; and s refers to a number (or a count) of the frames in the group of continuous frames. Coordinates of the pixel in the t-th frame in the group of continuous frames may be the same as coordinates of the target pixel in the current frame.

The processing engine 112 may determine the radius of the spatial domain filter based on the noise value and a preset relationship between the noise value and the radius of the spatial domain filter. A larger noise value may correspond to a larger radius of the spatial domain filter. In some embodiments, the radius of the spatial domain filter may be determined according to Equation (7):

$$Radius_{spa} = \begin{cases} 1 & (0 \le Noise < 2) \\ 2 & (2 \le Noise < 4) \\ 3 & (4 \le Noise < 8) \\ 4 & (8 \le Noise < 12) \\ 5 & (12 \le Noise < 16) \\ 6 & (16 \le Noise < 20) \\ 7 & (20 \le Noise) \end{cases} \quad (7)$$

where $Radius_{spa}$ refers to a radius of the spatial domain filter; and Noise refers to a noise value.

Figure 12:
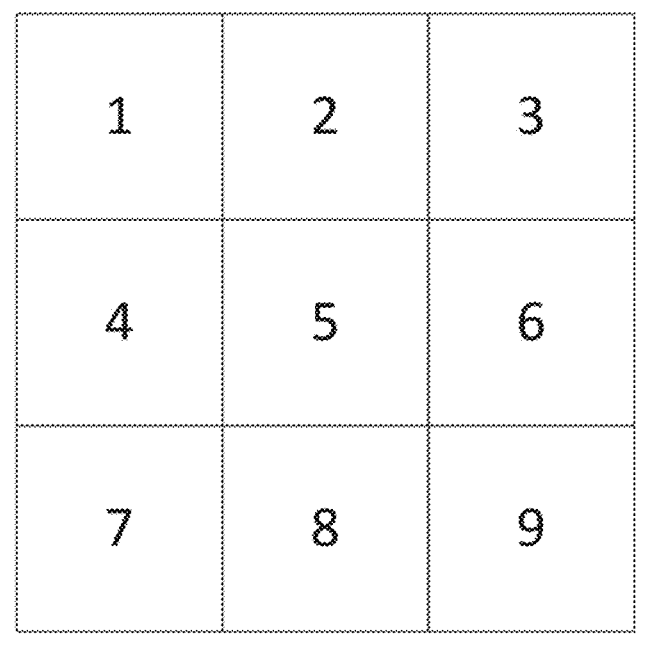

In some embodiments, the processing engine 112 may determine a third image block in the current frame based on coordinates of the target pixel in the current frame. The third image block may be the same as or different from a first image block in the current frame as described in connection with operation 510. For example, a size of the third image block in the current frame may be 3 pixels×3 pixels, as illustrated in FIG. 12, and the target pixel (e.g., a pixel 5 illustrated in FIG. 12) may be located in the center of the third image block.

In some embodiments, the processing engine 112 may determine at least one fourth image block in each of a group of continuous frames including the current frame and a plurality of reference frames based on the spatial domain filter size (e.g., a radius of the spatial domain filter) according to an image matching algorithm. The at least one fourth image block may be similar with the third image block in the current frame. A number (or a count) of the at least one fourth image block in the each of the group of continuous frames may be equal to the radius of the spatial domain filter. For example, assuming that a radius of the spatial domain filter is M, and a number of frames in a group of continuous frames is S, the processing engine 112 may determine M fourth image blocks in the each of the group of continuous frames, and a total number of the fourth image blocks in the group of continuous frames is M×S.

Figure 11:
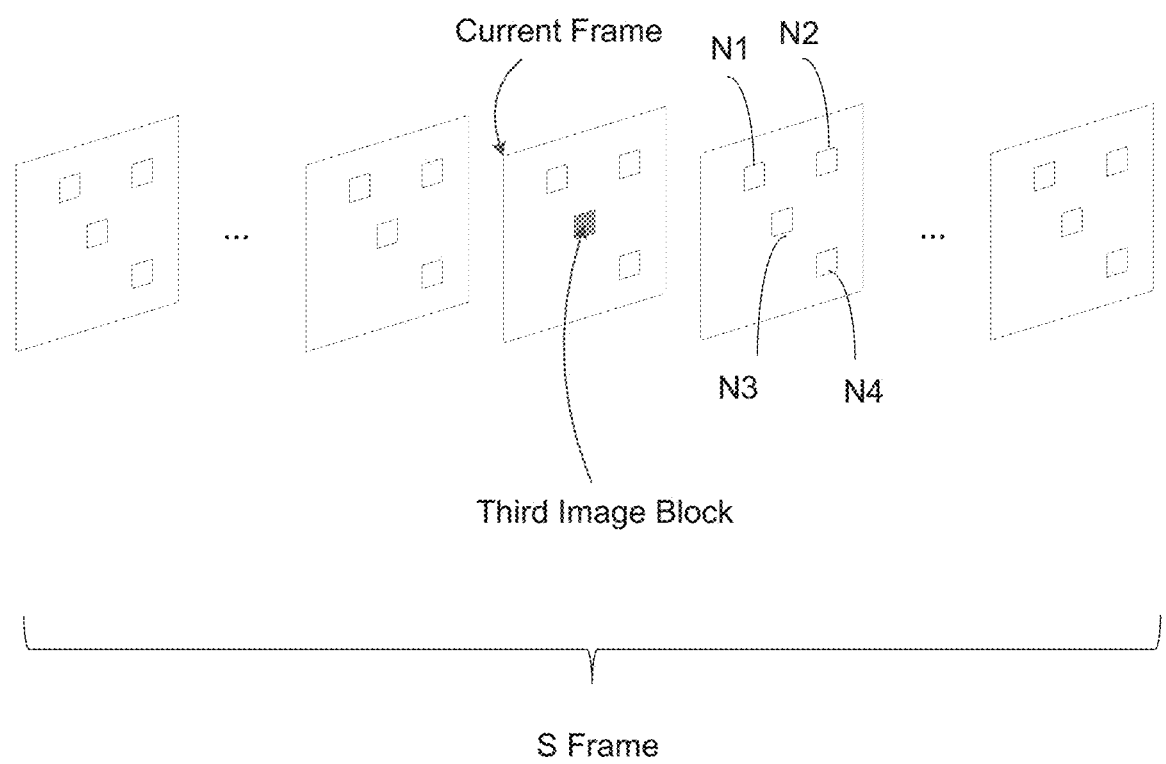
FIG. 11 is schematic diagram illustrating exemplary third image block and fourth image block according to some embodiments of the present disclosure.

FIG. 11 is schematic diagram illustrating exemplary third image block and fourth image block according to some embodiments of the present disclosure. As illustrated in FIG. 11, a group of continuous frames includes S frames. A third image block may be determined in a current frame. A plurality of fourth image blocks (e.g., N1, N2, N3, N4) may be determined in each of the group of continuous frames.

In some embodiments, the processing engine 112 may determine a difference between each fourth image block of the plurality of fourth image blocks in the group of continuous frames and the third image block in the current frame according to Equation (8):

$$Diff_{SAD} = \frac{\sum_{i=0}^{L} \sqrt{(M_i - N_i)^2}}{L} \quad (8)$$

where $Diff_{SAD}$ refers to a difference between a third image block and a fourth image block; $M_i$ refers to a value of a i-th pixel in the third image block; $N_i$ refers to a value of a i-th pixel in the fourth image block; L refers to a number (or a count) of pixels in the third image block (or the fourth image block). The processing engine 112 may determine a weight of the spatial domain filtering associated with the each fourth image block based on the difference between the each fourth image block of the plurality of fourth image blocks in the group of continuous frames and the third image block in the current frame according to Equation (9):

$$W_{spa} = e^{\frac{Diff_{SAD}^2}{sigma^2_{spa} \times Adjust_{spa}}} \quad (9)$$

where $W_{spa}$ refers to a weight of the spatial domain filtering associated with a fourth image block; $Diff_{SAD}$ refers to a difference between the fourth image block and a third image block; $Adjust_{spa}$ refers to a spatial domain filtering intensity; and $sigma_{spa}$ refers to a constant.

The processing engine 112 may determine a first value of the target pixel in the current frame by performing the spatial domain filtering operation on the target pixel according to Equation (10):

$$F_{SAD} = \frac{\sum_{i=1}^{M \times S} Point_i \times W_{spa,i}}{\sum_{i=1}^{M \times S} W_{spa,i}} \quad (10)$$

where $F_{SAD}$ refers to a first value of a target pixel in a current frame; $Point_i$ refers to a value of a pixel located in the center of a i-th fourth image block; $W_{spa,i}$ refers to a weight of the spatial domain filtering associated with the i-th fourth image block; S refers to a number (or a count) of frames in a group of continuous frames; and M refers to a number (or a count) of fourth image blocks in each of the group of continuous frames.

In 620, the processing engine 112 (e.g., the filter module 450) may determine, based on a weight of the time domain filtering operation associated with a reference pixel in each reference frame of a plurality of reference frames, a weight of the temporal domain filtering operation associated with the target pixel in the current frame, and a time domain filtering intensity, a target time domain filtering intensity for each of the reference pixel in the each reference frame of the plurality of reference frames and the target pixel in the current frame.

In some embodiments, the processing engine 112 may perform a motion detection operation on the current frame. For example, the processing engine 112 may determine an absolute value of a difference between a filtered value of the reference pixel in the reference frame and a filtered value of the target pixel in the current frame. A smaller absolute value of the difference may indicate that the target pixel tends to be stationary in the temporal domain. In some embodiments, the filtered value of the reference pixel in the each reference frame of the plurality of reference frame or the filtered value of the target pixel in the current frame may be determined by using a Gauss filter. In some embodiments, the processing engine 112 may determine the absolute value of the difference between the filtered value of the reference pixel in the reference frame and the filtered value of the target pixel in the current frame according to Equation (11):

$$Diff_t = |GauFilter(F_r + F_0)| \quad (11)$$

where $Diff_t$ refers to an absolute value of a difference between a filtered value of a reference pixel in a reference frame and a filtered value of a target pixel in a current frame;

GauFilter refers to a Gauss filter operation; GauFilter $F_0$ refers to a Gauss filtered value of a target pixel in a current frame; and GauFilter $F_t$ refers to a Gauss filtered value of a reference pixel in a t-th reference frame of a plurality of reference frames, 0<t<S.

The processing engine 112 may determine the weight of the temporal domain filtering operation associated with the reference pixel in the reference frame based on the absolute value of the difference and a preset relationship between the absolute value of the difference and the weight of the temporal domain filtering operation associated with the reference pixel.

Figure 13:
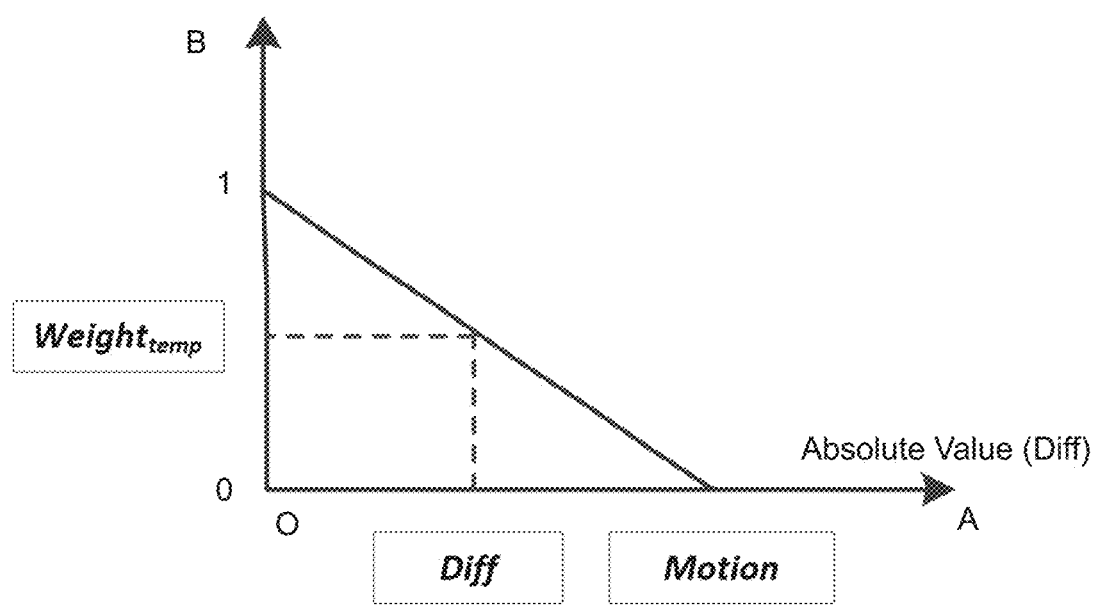
FIG. 13 is a schematic diagram illustrating a weight of temporal domain filtering operation according to some embodiments of the present disclosure.

FIG. 13 is a schematic diagram illustrating a weight of temporal domain filtering operation according to some embodiments of the present disclosure. As shown in FIG. 13, OA may correspond to an absolute value of a difference between a filtered value of a reference pixel in a reference frame and a filtered value of a target pixel in a current frame, and OB may correspond to a weight of the temporal domain filtering operation associated with the reference pixel in the reference frame. A larger absolute value of the difference may correspond to a smaller weight of the temporal domain filtering operation associated with the reference pixel in the reference frame. The weight of the temporal domain filtering operation associated with the reference pixel in the reference frame may be in a range of [0, 1]. In some embodiments, the processing engine 112 may determine the weight of the temporal domain filtering operation associated with the reference pixel in the reference frame according to Equation (12):

$$Weight_{tem,t} = \begin{cases} \dfrac{Motion - Diff_t}{Motion} & (Diff_t \leq Motion) \\ 0 & (Motion < Diff_t) \end{cases} \quad (12)$$

where $Weight_{tem,t}$ refers to a weight of the temporal domain filtering operation associated with the reference pixel in the reference frame; $Diff_t$ refers to an absolute value of a difference between a filtered value of a reference pixel in a reference frame and a filtered value of a target pixel in a current frame; and Motion refers to a constant.

In some embodiments, the processing engine 112 may determine the weight of the temporal domain filtering operation associated with the target pixel in the current frame. An absolute value of a difference between a filtered value of the target pixel in the current frame and the filtered value of the target pixel in the current frame is 0. The processing engine 112 may determine that the weight of the temporal domain filtering operation associated with the target pixel in the current frame is 1, as shown in FIG. 13.

The processing engine 112 may determine the target temporal domain filtering intensity for each of the reference pixel in the each reference frame of the plurality of reference frames and the target pixel in the current frame based on the weight of the temporal domain filtering operation associated with the reference pixel in the each reference frame of the plurality of reference frames, the weight of the temporal domain filtering operation associated with the target pixel in the current frame, and the temporal domain filtering intensity. For example, the processing engine 112 may determine the target temporal domain filtering intensity according to Equation (12):

$$WeightAd_{tem} = Weight_{tem} \times Adjust_{tem} \quad (13)$$

where $WeightAd_{tem}$ refers to a target temporal domain filtering intensity for a reference pixel in a reference frame (or a target temporal domain filtering intensity for a target pixel in a current frame); $Weight_{tem}$ refers to a weight of the temporal domain filtering operation associated with the reference pixel in the reference frame (or a weight of the temporal domain filtering operation associated with the target pixel in the current frame); and $Adjust_{tem}$ refers to a temporal domain filtering intensity.

In 630, the processing engine 112 (e.g., the filter module 450) may perform, based on a first value of the reference pixel in the each reference frame of the plurality of reference frames, the first value of the target pixel in the current frame, and the target time domain filtering intensity for each of the reference pixel in the each reference frame of the plurality of reference frames and the target pixel in the current frame, a time domain filtering operation on the target pixel in the current frame to determine a second value of the target pixel in the current frame.

In some embodiments, the first value of the reference pixel in the each reference frame may be determined by performing a spatial domain filtering operation on the reference pixel in the each reference frame. In some embodiments, the processing engine 112 may determine the second value of the target pixel in the current frame according to Equation (14):

$$F_{denoised} = \dfrac{\sum_{t=1}^{S} F'_{t,i,j} \times WeightAd_{tem,t,i,j}}{\sum_{t=1}^{S} WeightAd_{tem,t,i,j}} \quad (14)$$

where $F_{denoised}$ refers to a second value of a target pixel in a current frame; i, and j refers to coordinates of the target pixel in the current frame; $WeightAd_{tem,t,\ i,j}$ refers to a weight of the temporal domain filtering operation associated with a reference pixel (or the target pixel) in a t-th frame of a group of continuous frames; $F'_{t,\ i,j}$ refers to a first value of a reference pixel (or the target pixel) in the t-th frame of the group of continuous frames.

It should be noted that the above description is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added in process 600. For example, an operation for updating the first value of the target pixel in the current frame may be added before operation 620. In some embodiments, the processing engine 112 may determine, based on an original value of the target pixel, the first value of the target pixel, the weight of the temporal domain filtering operation associated with the target pixel, and the weight of the spatial domain filtering operation associated with the target pixel, an updated first value of the target pixel in the current frame. A sum of the weight of the temporal domain filtering operation associated with the target pixel and the weight of the spatial domain filtering operation associated with the target pixel may be 1. For example, the processing engine 112 may determine a product of the original value of the target pixel and the weight of the temporal domain filtering operation associated with the target pixel. The processing engine 112 may determine a product of the first value of the target pixel and the weight of the spatial domain filtering operation associated with the target pixel. The processing engine 112 may determine, based on a sum of the product of the original value of the target pixel and the weight of the temporal domain filtering operation associated with the target pixel, and the product of the first value of the target pixel and the weight of the spatial domain filtering operation associated with the target pixel, the updated first value of the target pixel in the current frame. In some embodiments, the processing engine 112 may determine the updated first value of the target pixel in the current frame according to Equation (15):

$$F'=F \times \text{Weight}_{tem} \times F_{spa} \times (1.0-\text{Weight}_{tem}) \qquad (15)$$

where F' refers to an updated first value of a target pixel in a current frame; F refers to an original value of the target pixel in the current frame; $\text{Weight}_{tem}$ refers to a weight of the temporal domain filtering operation associated with the target pixel in the current frame; $F_{spa}$ refers to a first value of the target pixel in the current frame. The processing engine 112 may determine the second value of the target pixel by performing the temporal domain filtering operation on the target pixel in the current frame based on the updated first value of the target pixel in the current frame.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for noise reduction implemented on a computing device having at least one processor and at least one storage device, the method comprising:
   determining a plurality of first image blocks, each first image block being in each frame of a group of continuous frames including a current frame and a plurality of reference frames based on coordinates of a target pixel in the current frame;
   determining a plurality of second image blocks, in which there is at least one second image block corresponding to the first image block in each frame of the group of continuous frames, wherein the at least one second image block is similar with the corresponding first image block;
   determining, based on coordinates of the plurality of second image blocks in the group of continuous frames, an average offset between the at least one second image block in the current frame and second image blocks in the plurality of reference frames; and
   determining, based on the average offset, a spatial domain filtering intensity and a temporal domain filtering intensity for the target pixel in the current frame.

2. The method of claim 1, wherein a larger average offset corresponds to a larger spatial domain filtering intensity and a smaller temporal domain filtering intensity for the target pixel in the current frame.

3. The method of claim 1, further comprising:
   performing a spatial domain filtering operation and a temporal domain filtering operation on the target pixel in the current frame based on the spatial domain filtering intensity, the temporal domain filtering intensity, and a spatial domain filter size.

4. The method of claim 3, wherein performing the spatial domain filtering operation and the temporal domain filtering operation on the target pixel in the current frame based on the spatial domain filtering intensity, the temporal domain filtering intensity, and the spatial domain filter size, comprises:
   performing, based on the spatial domain filtering intensity and the spatial domain filter size, the spatial domain filtering operation on the target pixel in the current frame to determine a first value of the target pixel in the current frame; and
   performing, based on the temporal domain filtering intensity, the first value of the target pixel in the current frame, and a first value of a reference pixel in each reference frame of the plurality of reference frames, the temporal domain filtering operation on the target pixel in the current frame to determine a second value of the target pixel in the current frame, wherein the coordinates of the target pixel in the current frame are the same as coordinates of the reference pixel in the each reference frame, and the first value of the reference pixel in the each reference frame is determined by performing a spatial domain filtering operation on the reference pixel in the each reference frame.

5. The method of claim 4, wherein performing, based on the temporal domain filtering intensity, the first value of the target pixel in the current frame, and the first value of the reference pixel in the each reference frame of the plurality of reference frames, the temporal domain filtering operation on the target pixel in the current frame to determine the second value of the target pixel in the current frame, further comprises:
   determining, based on a weight of the temporal domain filtering operation associated with the reference pixel in the each reference frame of the plurality of reference frames, a weight of the temporal domain filtering operation associated with the target pixel in the current frame, and the temporal domain filtering intensity, a target temporal domain filtering intensity for the reference pixel in the each reference frame of the plurality of reference frames and the target pixel in the current frame; and
   performing, based on the first value of the reference pixel in the each reference frame of the plurality of reference frames, the first value of the target pixel in the current frame, and the target temporal domain filtering intensity for the reference pixel in the each reference frame of the plurality of reference frames and the target pixel in the current frame, the temporal domain filtering operation on the target pixel in the current frame to determine the second value of the target pixel in the current frame.

6. The method of claim 5, further comprising:
   determining, based on an original value of the target pixel, the first value of the target pixel, the weight of the temporal domain filtering operation associated with the target pixel, and a weight of the spatial domain filtering operation associated with the target pixel, an updated first value of the target pixel in the current frame, wherein a sum of the weight of the temporal domain filtering operation associated with the target pixel and the weight of the spatial domain filtering operation associated with the target pixel is 1.

7. The method of claim 6, wherein determining, based on the original value of the target pixel, the first value of the target pixel, the weight of the temporal domain filtering operation associated with the target pixel, and the weight of the spatial domain filtering operation associated with the target pixel, the updated first value of the target pixel in the current frame, comprises:
- determining a product of the original value of the target pixel and the weight of the temporal domain filtering operation associated with the target pixel;
- determining a product of the first value of the target pixel and the weight of the spatial domain filtering operation associated with the target pixel; and
- determining, based on a sum of the product of the original value of the target pixel and the weight of the temporal domain filtering operation associated with the target pixel, and the product of the first value of the target pixel and the weight of the spatial domain filtering operation associated with the target pixel, the updated first value of the target pixel in the current frame.

8. The method of claim 5, wherein the weight of the temporal domain filtering operation associated with the reference pixel in the each reference frame of the plurality of reference frames is determined according to a process, the process comprising:
- determining an absolute value of a difference between a filtered value of the reference pixel in the each reference frame and a filtered value of the target pixel in the current frame; and
- determining, based on the absolute value of the difference and a preset relationship between the absolute value of the difference and the weight of the temporal domain filtering operation associated with the reference pixel in the each reference frame, the weight of the temporal domain filtering operation associated with the reference pixel in the each reference frame, wherein the weight of the temporal domain filtering operation associated with the reference pixel in the each reference frame is in a range of [0, 1], and a larger absolute value of the difference corresponding to a smaller weight of the temporal domain filtering operation associated with the reference pixel in the each reference frame.

9. The method of claim 3, wherein the spatial domain filter size includes a radius of the spatial domain filter, and the radius of the spatial domain filter is determined according to a process, the process comprising:
- determining, based on a filtered value of the reference pixel in the each reference frame of the plurality of reference frames and a filtered value of the target pixel in the current frame, a noise value; and
- determining, based on the noise value and a preset relationship between the noise value and the radius of the spatial domain filter, the radius of the spatial domain filter, wherein a larger noise value corresponds to a larger radius of the spatial domain filter.

10. The method of claim 9, wherein determining, based on the filtered value of the reference pixel in the each reference frame of the plurality of reference frame and the filtered value of the target pixel in the current frame, the noise value, further comprises:
- determining, based on a difference between an average value of the filtered values of the reference pixels and the target pixels, and the filtered value of the target pixel in the current frame, the noise value.

11. The method of claim 10, wherein at least one of the filtered value of the reference pixel in the each reference frame of the plurality of reference frame or the filtered value of the target pixel in the current frame is determined by using a Gauss filter.

12. The method of claim 1, wherein the at least one second image block corresponding to the first image block in each of the group of continuous frames is determined according to a sum of absolute differences (SAD) algorithm.

13. A system for noise reduction, comprising:
- at least one storage medium storing a set of instructions; and
- at least one processor in communication with the at least one storage medium, wherein when executing the stored set of instructions, the at least one processor causes the system to:
  - determine a plurality of first image blocks, each first image block being in each frame of a group of continuous frames including a current frame and a plurality of reference frames based on coordinates of a target pixel in the current frame;
  - determine a plurality of second image blocks, in which there is at least one second image block corresponding to the first image block in each frame of the group of continuous frames, wherein the at least one second image block is similar with the corresponding first image block;
  - determine, based on coordinates of the plurality of second image blocks in the group of continuous frames, an average offset between the at least one second image block in the current frame and second image blocks in the plurality of reference frames; and
  - determine, based on the average offset, a spatial domain filtering intensity and a temporal domain filtering intensity for the target pixel in the current frame.

14. The system of claim 13, wherein the at least one processor causes the system to:
- perform a spatial domain filtering operation and a temporal domain filtering operation on the target pixel in the current frame based on the spatial domain filtering intensity, the temporal domain filtering intensity, and a spatial domain filter size.

15. The system of claim 14, wherein to perform the spatial domain filtering operation and the temporal domain filtering operation on the target pixel in the current frame based on the spatial domain filtering intensity, the temporal domain filtering intensity, and the spatial domain filter size, the at least one processor causes the system to:
- perform, based on the spatial domain filtering intensity and the spatial domain filter size, the spatial domain filtering operation on the target pixel in the current frame to determine a first value of the target pixel in the current frame; and
- perform, based on the temporal domain filtering intensity, the first value of the target pixel in the current frame, and a first value of a reference pixel in each reference frame of the plurality of reference frames, the temporal domain filtering operation on the target pixel in the current frame to determine a second value of the target pixel in the current frame, wherein the coordinates of the target pixel in the current image are the same as coordinates of the reference pixel in the each reference frame, and the first value of the reference pixel in the each reference frame is determined by performing a spatial domain filtering operation on the reference pixel in the each reference frame.

16. The system of claim 15, wherein to perform, based on the temporal domain filtering intensity, the first value of the target pixel in the current frame, and the first value of the reference pixel in the each reference frame of the plurality of reference frame, the temporal domain filtering operation on the target pixel in the current frame to determine the second value of the target pixel in the current frame, the at least one processor causes the system to:
  determine, based on a weight of the temporal domain filtering operation associated with the reference pixel in the each reference frame of the plurality of reference frames, a weight of the temporal domain filtering operation associated with the target pixel in the current frame, and the temporal domain filtering intensity, a target temporal domain filtering intensity for the reference pixel in the each reference frame of the plurality of reference frames and the target pixel in the current frame; and
  perform, based on the first value of the reference pixel in the each reference frame of the plurality of reference frames, the first value of the target pixel in the current frame, and the target temporal domain filtering intensity for the reference pixel in the each reference frame of the plurality of reference frames and the target pixel in the current frame, the temporal domain filtering operation on the target pixel in the current frame to determine the second value of the target pixel in the current frame.

17. The system of claim 16, wherein the at least one processor causes the system to:
  determine, based on an original value of the target pixel, the first value of the target pixel, the weight of the temporal domain filtering operation associated with the target pixel, and a weight of the spatial domain filtering operation associated with the target pixel, an updated first value of the target pixel in the current frame, wherein a sum of the weight of the temporal domain filtering operation associated with the target pixel and the weight of the spatial domain filtering operation associated with the target pixel is 1.

18. The system of claim 17, wherein to determine, based on the original value of the target pixel, the first value of the target pixel, the weight of the temporal domain filtering operation associated with the target pixel, and the weight of the spatial domain filtering operation associated with the target pixel, the updated first value of the target pixel in the current frame, the at least one processor causes the system to:
  determine a product of the original value of the target pixel and the weight of the temporal domain filtering operation associated with the target pixel;
  determine a product of the first value of the target pixel and the weight of the spatial domain filtering operation associated with the target pixel; and
  determine, based on a sum of the product of the original value of the target pixel and the weight of the temporal domain filtering operation associated with the target pixel, and the product of the first value of the target pixel and the weight of the spatial domain filtering operation associated with the target pixel, the updated first value of the target pixel in the current frame.

19. The system of claim 14, wherein the spatial domain filter size includes a radius of the spatial domain filter, and the radius of the spatial domain filter is determined according to a process, the process comprising:
  determining, based on a filtered value of the reference pixel in the each reference frame of the plurality of reference frames and a filtered value of the target pixel in the current frame, a noise value; and
  determining based on the noise value and a preset relationship between the noise value and the radius of the spatial domain filter, the radius of the spatial domain filter, wherein a larger noise value corresponds to a larger radius of the spatial domain filter.

20. A non-transitory computer readable medium storing instructions, the instructions, when executed by at least one processor, causing the at least one processor to implement a method comprising:
  determining a plurality of first image blocks, each first image block being in each frame of a group of continuous frames including a current frame and a plurality of reference frames based on coordinates of a target pixel in the current frame;
  determining a plurality of second image blocks, in which there is at least one second image block corresponding to the first image block in each frame of the group of continuous frames, wherein the at least one second image block is similar with the corresponding first image block;
  determining, based on coordinates of the plurality of second image blocks in the group of continuous frames, an average offset between the at least one second image block in the current frame and second image blocks in the plurality of reference frames; and
  determining, based on the average offset, a spatial domain filtering intensity and a temporal domain filtering intensity for the target pixel in the current frame.

\* \* \* \* \*